US012424147B2

(12) United States Patent
Kim et al.

(10) Patent No.: US 12,424,147 B2
(45) Date of Patent: Sep. 23, 2025

(54) GATE SIGNAL MASKING CIRCUIT, GATE DRIVER INCLUDING THE SAME AND DISPLAY APPARATUS INCLUDING THE SAME

(71) Applicant: Samsung Display Co., LTD., Yongin-si (KR)

(72) Inventors: Kyungho Kim, Yongin-si (KR); Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/441,382

(22) Filed: Feb. 14, 2024

(65) Prior Publication Data

US 2024/0355269 A1 Oct. 24, 2024

(30) Foreign Application Priority Data

Apr. 24, 2023 (KR) ........................ 10-2023-0053637

(51) Int. Cl.
*G09G 3/3266* (2016.01)
*G09G 3/32* (2016.01)

(52) U.S. Cl.
CPC ....... *G09G 3/32* (2013.01); *G09G 2300/0426* (2013.01); *G09G 2310/0267* (2013.01)

(58) Field of Classification Search
None
See application file for complete search history.

(56) References Cited

U.S. PATENT DOCUMENTS

2017/0110050 A1* 4/2017 Park .................... G09G 3/3208
2017/0186363 A1* 6/2017 Park .................... G09G 3/3266
2021/0407429 A1* 12/2021 Seo .................... G09G 3/3233

* cited by examiner

*Primary Examiner* — Krishna P Neupane
(74) *Attorney, Agent, or Firm* — CANTOR COLBURN LLP

(57) ABSTRACT

A gate signal masking circuit includes a first switching element including a control electrode connected to a masking node, a first electrode connected to a first node and a second electrode connected to a third node, a second switching element including a control electrode receiving a carry signal, a first electrode receiving a masking signal and a second electrode connected to a fourth node, a third switching element including a control electrode receiving a first enable signal, a first electrode connected to the fourth node and a second electrode connected to the masking node, a fourth switching element including a control electrode receiving a second enable signal, a first electrode connected to the masking node and a second electrode connected to a fifth node and a fifth switching element including a control electrode receiving the carry signal, a first electrode connected to the fifth node and a second electrode.

23 Claims, 25 Drawing Sheets

GATE SIGNAL MASKING CIRCUIT, GATE DRIVER INCLUDING THE SAME AND DISPLAY APPARATUS INCLUDING THE SAME

This application claims priority to Korean Patent Application No. 10-2023-0053637, filed on Apr. 24, 2023, and all the benefits accruing therefrom under 35 U.S.C. § 119, the content of which in its entirety is herein incorporated by reference.

BACKGROUND

1. Field

Embodiments of the invention relate to a gate signal masking circuit, a gate driver including the gate signal masking circuit and a display apparatus including the gate driver. More particularly, embodiments of the invention relate to a gate signal masking circuit with reduced power consumption, a gate driver including the gate signal masking circuit and a display apparatus including the gate driver.

2. Description of the Related Art

Generally, a display apparatus includes a display panel and a display panel driver. The display panel typically includes a plurality of gate lines, a plurality of data lines, a plurality of emission lines and a plurality of pixels. The display panel driver may include a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

When an image displayed on the display panel is a static image or the display panel is operated in an always-on mode, a driving frequency of the display panel may be decreased to reduce a power consumption.

SUMMARY

In a display device, when a portion of an image displayed on a display panel is a static image and a portion of the image displayed on the display panel is a moving image, it is desired to reduce a driving frequency of the portion of the display panel corresponding to the static image to further reduce the power consumption.

However, a stage of a gate driver may receive an output of a previous stage as a carry signal to output a gate signal so that the driving frequency of only the portion of the display panel corresponding to the static image may not be decreased.

Embodiments of the invention provide a gate signal masking circuit supporting a multiple division of a driving frequency to reduce a power consumption of the display apparatus.

Embodiments of the invention also provide a gate driver including the gate signal masking circuit.

Embodiments of the invention also provide a display apparatus including the gate driver.

In an embodiment of a gate signal masking circuit according to the invention, the gate signal masking circuit includes a first switching element including a control electrode connected to a masking control node, a first electrode connected to a first control node and a second electrode connected to a third control node, a second switching element including a control electrode which receives a carry signal, a first electrode which receives a masking power signal and a second electrode connected to a first intermediate node, a third switching element including a control electrode which receives a first enable signal, a first electrode connected to the first intermediate node and a second electrode connected to the masking control node, a fourth switching element including a control electrode which receives a second enable signal, a first electrode connected to the masking control node and a second electrode connected to a second intermediate node and a fifth switching element including a control electrode which receives the carry signal, a first electrode connected to the second intermediate node and a second electrode which receives a low power voltage.

In an embodiment, the gate signal masking circuit may further include a sixth switching element including a control electrode connected to the third control node, a first electrode which receives a first clock signal and a second electrode connected to a gate output node, a seventh switching element including a control electrode connected to a second control node, a first electrode connected to the gate output node and a second electrode which receives the low power voltage and an eighth switching element including a control electrode connected to the second control node, a first electrode which receives the first clock signal and a second electrode connected to the third control node In an embodiment, the gate signal masking circuit may further include a first masking capacitor including a first electrode which receives the first clock signal and a second electrode connected to the third control node and a second masking capacitor including a first electrode connected to the masking control node and a second electrode which receives the low power voltage.

In an embodiment, the masking power signal may be a clock signal having a high level when the first enable signal changes from an active level to an inactive level and when the first enable signal changes from the inactive level to the active level.

In an embodiment, when the first enable signal has an inactive level in all periods in which the carry signal has an active level, the gate signal masking circuit may output a gate pulse.

In an embodiment, when the first enable signal has an active level in all periods in which the carry signal has an active level, the gate signal masking circuit may not output a gate pulse.

In an embodiment, when the first enable signal is changed from an inactive level to an active level during a period in which the carry signal has an active level, the gate signal masking circuit may output a gate pulse.

In an embodiment, when the first enable signal is changed from an active level to an inactive level during a period in which the carry signal has an active level, the gate signal masking circuit may not output a gate pulse.

In an embodiment of a gate driver according to the invention, the gate driver includes a carry generator and a gate signal masking circuit. In such an embodiment, the carry generator generates a carry signal based on a previous carry signal, a first clock signal, a second clock signal and a low power voltage. The gate signal masking circuit is connected to the carry generator. In such an embodiment, the gate signal masking circuit includes a first switching element including a control electrode connected to a masking control node, a first electrode connected to a first control node and a second electrode connected to a third control node, a second switching element including a control electrode which receives a carry signal, a first electrode which receives a masking power signal and a second electrode connected to a first intermediate node, a third switching element including a control electrode which receives a first enable signal, a first electrode connected to the first intermediate node and a second electrode connected to the masking control node, a fourth switching element including a control electrode which receives a second enable signal, a first electrode connected to the masking control node and a second electrode connected to a second intermediate node and a fifth switching element including a control electrode which receives the carry signal, a first electrode connected to the second intermediate node and a second electrode which receives the low power voltage.

In an embodiment, the gate signal masking circuit may further include a sixth switching element including a control electrode connected to the third control node, a first electrode which receives the first clock signal and a second electrode connected to a gate output node, a seventh switching element including a control electrode connected to a second control node, a first electrode connected to the gate output node and a second electrode which receives the low power voltage and an eighth switching element including a control electrode connected to the second control node, a first electrode which receives the first clock signal and a second electrode connected to the third control node.

In an embodiment, the gate signal masking circuit may further include a first masking capacitor including a first electrode which receives the first clock signal and a second electrode connected to the third control node and a second masking capacitor including a first electrode connected to the masking control node and a second electrode which receives the low power voltage.

In an embodiment, the carry generator may include a first gate switching element including a control electrode which receives the first clock signal, a first electrode which receives the previous carry signal and a second electrode connected to a first node, a second gate switching element including a control electrode connected to a second control node, a first electrode which receives the second clock signal and a second electrode connected to a fifth node, a third gate switching element including a control electrode which receives the first clock signal, a first electrode connected to a second node and a second electrode which receives the low power voltage, a fourth gate switching element including a control electrode which receives the low power voltage, a first electrode connected to the second node and a second electrode connected to a third node, a fifth gate switching element including a control electrode connected to the second control node, a first electrode which receives the first clock signal and a second electrode connected to the second node, a sixth gate switching element including a control electrode connected to the third node, a first electrode which receives the second clock signal and a second electrode connected to a third intermediate node, a seventh gate switching element including a control electrode connected to the third node, a first electrode connected to a fourth node and a second electrode connected to the third intermediate node, an eighth gate switching element including a control electrode which receives the second clock signal, a first electrode connected to the fourth node and a second electrode connected to the first control node, a ninth gate switching element including a control electrode connected to the first control node, a first electrode which receives the first clock signal and a second electrode connected to a carry output node, a tenth gate switching element including a control electrode connected to the second control node, a first electrode connected to the carry output node and a second electrode which receives the low power voltage, an eleventh switching element including a control electrode which receives the low power voltage, a first electrode connected to the first node and a second electrode connected to the second control node and a fourteenth switching element including a control electrode connected to the second control node, a first electrode which receives the first clock signal and a second electrode connected to the first control node.

In an embodiment, the carry generator may further include a twelfth gate switching element including a control electrode which receives a reset signal, a first electrode which receives the first clock signal and a second electrode connected to the first node and a thirteenth gate switching element including a control electrode which receives the reset signal, a first electrode connected to the first control node and a second electrode connected to the low power voltage.

In an embodiment, the carry generator may further include a first capacitor including a first electrode which receives the first clock signal and a second electrode connected to the first control node, a second capacitor including a first electrode connected to the third node and a second electrode connected to the fourth node and a third capacitor including a first electrode connected to the fifth node and a second electrode connected to the second control node.

In an embodiment, the control electrode of the tenth gate switching element and the control electrode of the fourteenth gate switching element may be connected to the control electrode of the seventh switching element of the gate signal masking circuit and the control electrode of the eighth switching element of the gate signal masking circuit.

In an embodiment, the control electrode of the ninth gate switching element may be connected to the first electrode of the first switching element of the gate signal masking circuit.

In an embodiment of a display apparatus according to the invention, the display apparatus includes a display panel, a gate driver and a data driver. In such an embodiment, the display panel includes a pixel including a switching element of a first type and a switching element of a second type different from the first type. In such an embodiment, the gate driver outputs a gate signal to the display panel. In such an embodiment, the data driver outputs a data voltage to the display panel. In such an embodiment, the gate driver includes a carry generator which generates a carry signal based on a previous carry signal, a first clock signal, a second clock signal and a low power voltage and a gate signal masking circuit connected to the carry generator. In such an embodiment, the gate signal masking circuit includes a first switching element including a control electrode connected to a masking control node, a first electrode connected to a first control node and a second electrode connected to a third control node, a second switching element including a control electrode which receives the carry signal, a first electrode which receives a masking power signal and a second electrode connected to a first intermediate node, a third switching element including a control electrode which receives a first enable signal, a first electrode connected to the first intermediate node and a second electrode connected to the masking control node, a fourth switching element including a control electrode which receives a second enable signal, a first electrode connected to the masking control node and a second electrode connected to a second intermediate node and a fifth switching element including a control electrode which receives the carry signal, a first electrode connected to the second intermediate node and a second electrode which receives the low power voltage.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives an emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element and the light emitting element including the anode electrode and a cathode electrode which receives a pixel low power voltage. In such an embodiment, an output signal of the gate signal masking circuit may be the compensation gate signal.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives an emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element and the light emitting element including the anode electrode and a cathode electrode which receives a pixel low power voltage. In such an embodiment, the light emitting element initialization gate signal may be a data writing gate signal of a previous stage, and an output signal of the gate signal masking circuit may be the compensation gate signal.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives an emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element, an eighth pixel switching element including a control electrode which receives a bias gate signal, a first electrode which receives a bias voltage and a second electrode connected to the second pixel node and the light emitting element including the anode electrode and a cathode electrode which receives a pixel low power voltage. In such an embodiment, an output signal of the gate signal masking circuit may be the compensation gate signal.

In an embodiment of a gate driver according to the invention, the gate driver includes a carry generator and a gate signal masking circuit. In such an embodiment, the carry generator generates a carry signal based on a previous carry signal, a first clock signal, a second clock signal and a low power voltage. In such an embodiment, the gate signal masking circuit is connected to the carry generator. In such an embodiment, the gate signal masking circuit outputs a gate pulse or stops outputting the gate pulse based on the carry signal, a first enable signal and a second enable signal.

In an embodiment, the gate signal masking circuit may include a first switching element including a control electrode connected to a masking control node, a first electrode connected to a first control node and a second electrode connected to a third control node, a second switching element including a control electrode which receives the carry signal, a first electrode which receives a masking power signal and a second electrode connected to a first intermediate node, a third switching element including a control electrode which receives the first enable signal, a first electrode connected to the first intermediate node and a second electrode connected to the masking control node, a fourth switching element including a control electrode which receives the second enable signal, a first electrode connected to the masking control node and a second electrode connected to a second intermediate node and a fifth switching element including a control electrode which receives the carry signal, a first electrode connected to the second intermediate node and a second electrode which receives the low power voltage.

In an embodiment of a display apparatus according to the invention, the display apparatus includes a display panel, a gate driver and a data driver. In such an embodiment, the display panel includes a pixel including a switching element of a first type and a switching element of a second type different from the first type. In such an embodiment, the gate driver outputs a gate signal to the display panel. In such an embodiment, the data driver outputs a data voltage to the display panel. In such an embodiment, the gate driver includes a carry generator which generates a carry signal based on a previous carry signal, a first clock signal, a second clock signal and a low power voltage and a gate signal masking circuit connected to the carry generator. In such an embodiment, the gate signal masking circuit outputs a gate pulse or stops outputting the gate pulse based on the carry signal, a first enable signal and a second enable signal.

According to embodiments of the gate signal masking circuit, the gate driver and the display apparatus, the output of the gate signal may be controlled based on the carry signal, the first enable signal and the second enable signal so that the multiple division of the driving frequency may be supported.

In such embodiments, the power consumption of the display apparatus may be effectively reduced through the multiple division of the driving frequency.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
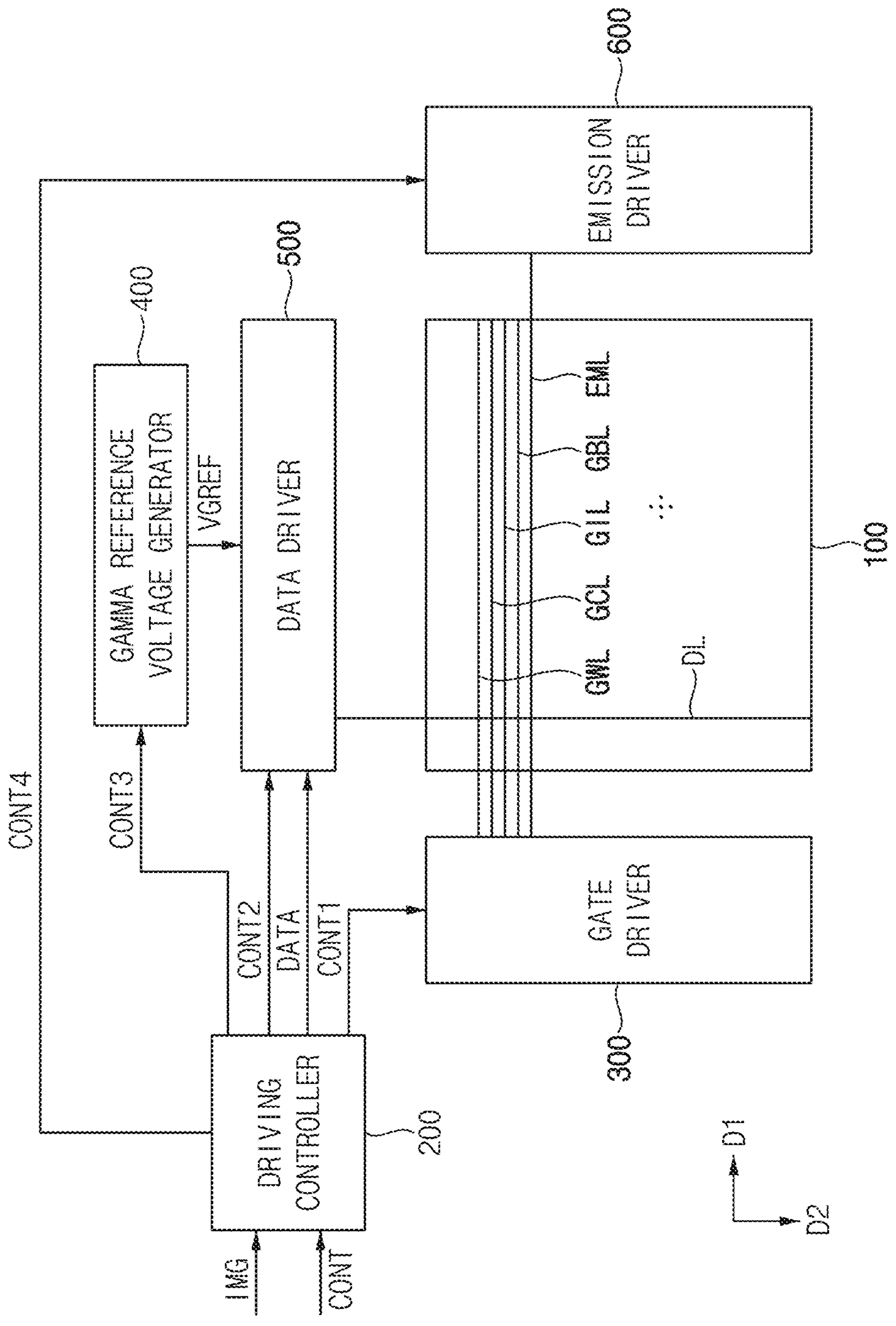
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one"

do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver may include a driving controller 200, a gate driver 300, a gamma reference voltage generator 400, a data driver 500 and an emission driver 600.

In an embodiment, the display panel 100 includes a display region, on which an image is displayed, and a peripheral region adjacent to the display region.

The display panel 100 may include a plurality of gate lines GWL, GCL, GIL and GBL, a plurality of data lines DL, a plurality of emission lines EML and a plurality of pixels electrically connected to the gate lines GWL, GCL, GIL and GBL, the data lines DL and the emission lines EML. The gate lines GWL, GCL, GIL and GBL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. In an embodiment, for example, the input image data IMG may include red image data, green image data and blue image data. The input image data IMG may further include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 may generate the data signal DATA based on the input image data IMG. The driving controller 200 outputs the data signal DATA to the data driver 500.

The driving controller 200 may generate the third control signal CONT3 for controlling an operation of the gamma reference voltage generator 400 based on the input control signal CONT, and outputs the third control signal CONT3 to the gamma reference voltage generator 400.

The driving controller 200 may generate the fourth control signal CONT4 for controlling an operation of the emission driver 600 based on the input control signal CONT, and outputs the fourth control signal CONT4 to the emission driver 600.

The gate driver 300 may generate gate signals driving the gate lines GWL, GCL, GIL and GBL in response to the first control signal CONT1 received from the driving controller 200. The gate driver 300 may sequentially output the gate signals to the gate lines GWL, GCL, GIL and GBL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The emission driver 600 may generate emission signals to drive the emission lines EML in response to the fourth control signal CONT4 received from the driving controller 200. The emission driver 600 may output the emission signals to the emission lines EML.

Although an embodiment where the gate driver 300 is disposed at a first side of the display panel 100 and the emission driver 600 is disposed at a second side of the display panel 100 opposite to the first side is shown in FIG. 1 for convenience of description, the invention may not be limited thereto. In an embodiment, for example, both of the gate driver 300 and the emission driver 600 may be disposed at the first side of the display panel 100. In an embodiment, for example, the gate driver 300 and the emission driver 600 may be disposed at opposing sides of the display panel 100. In an embodiment, for example, the gate driver 300 and the emission driver 600 may be integrally formed with each other as a single chip.

Figure 2:
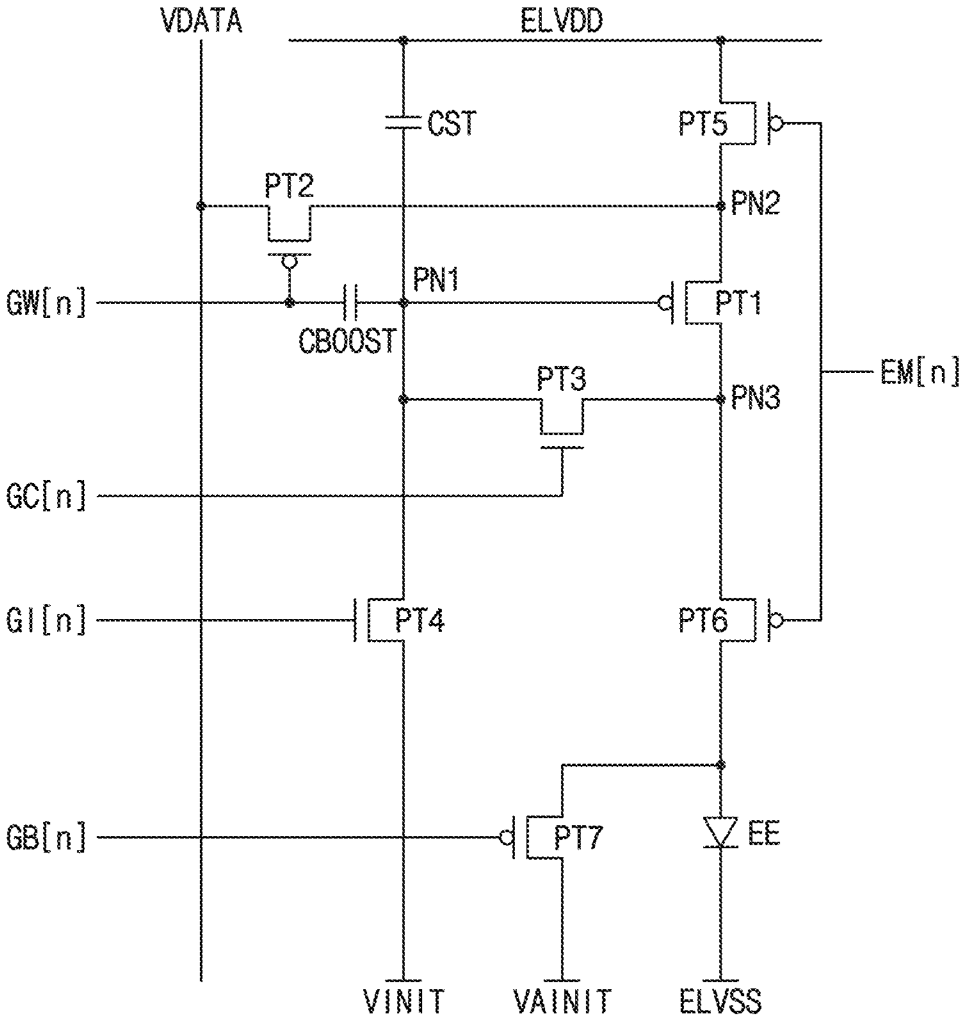
FIG. 2 is a circuit diagram illustrating an embodiment of a pixel of the display panel of FIG. 1.

FIG. 2 is a circuit diagram illustrating an embodiment of a pixel of the display panel 100 of FIG. 1.

Referring to FIGS. 1 and 2, in an embodiment, the display panel 100 includes a plurality of pixels. Each of the pixels may include a light emitting element EE.

In such an embodiment, the pixel receives a data writing gate signal GW, a compensation gate signal GC, a data initialization gate signal GI, a light emitting element initialization signal GB, the data voltage VDATA and the emission signal EM and the light emitting element EE of the pixel emits light corresponding to the level of the data voltage VDATA to display the image.

In an embodiment, the pixel may include a switching element of a first type and a switching element of a second type different from the first type. In an embodiment, for example, the switching element of the first type may be a polysilicon thin film transistor. In an embodiment, for example, the switching element of the first type may be a low temperature polysilicon (LTPS) thin film transistor. In an embodiment, for example, the switching element of the second type may be an oxide thin film transistor. In an embodiment, for example, the switching element of the first type may be a P-type transistor and the switching element of the second type may be an N-type transistor.

At least one of the pixels may include first to seventh pixel switching elements PT1 to PT7 and the light emitting element EE.

The pixel may include a first pixel switching element PT1 including a control electrode connected to a first pixel node PN1, a first electrode connected to a second pixel node PN2 and a second electrode connected to a third pixel node PN3, a second pixel switching element PT2 including a control electrode that receives the data writing gate signal GW[n], a first electrode that receives the data voltage VDATA and a second electrode connected to the second pixel node PN2, a third pixel switching element PT3 including a control electrode that receives the compensation gate signal GC[n], a first electrode connected to the first pixel node PN1 and a second electrode connected to the third pixel node PN3, a fourth pixel switching element PT4 including a control electrode that receives the data initialization gate signal GI[n], a first electrode that receives an initialization voltage VINIT and a second electrode connected to the first pixel node PN1, a fifth pixel switching element PT5 including a control electrode that receives the emission signal EM[n], a first electrode that receives a pixel high power voltage ELVDD and a second electrode connected to the second pixel node PN2, a sixth pixel switching element PT6 including a control electrode that receives the emission signal EM[n], a first electrode connected to the third pixel node PN3 and a second electrode connected to an anode electrode of the light emitting element EE, a seventh pixel switching element PT7 including a control electrode that receives the light emitting element initialization gate signal GB[n], a first electrode that receives a light emitting element initialization voltage VAINIT and a second electrode connected to the anode electrode of the light emitting element EE, and the light emitting element EE including the anode electrode and a cathode electrode that receives a pixel low power voltage ELVSS.

The pixel may further include a storage capacitor CST including a first electrode that receives the pixel high power voltage ELVDD and a second electrode connected to the first pixel node PN1 and a boosting capacitor CBOOST including a first electrode that receives the data writing gate signal GW[n] and a second electrode connected to the first pixel node PN1.

The signal outputted from a gate signal masking circuit of the gate driver 300 may be the compensation gate signal GC[n].

A driving current may flow through the fifth pixel switching element PT5, the first pixel switching element PT1 and the sixth pixel switching element PT6 to drive the light emitting element EE. An intensity of the driving current may be determined by the level of the data voltage VDATA. A luminance of the light emitting element EE may be determined by the intensity of the driving current.

In an embodiment, when the image displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In an embodiment, the third pixel switching element PT3 and the fourth pixel switching element PT4 may be the oxide thin film transistors. In such an embodiment, the first pixel switching element PT1, the second pixel switching element PT2, the fifth pixel switching element PT5, the sixth pixel switching element PT6 and the seventh pixel switching element PT7 may be the polysilicon thin film transistors.

Although some of the pixel switching elements are the oxide thin film transistors and other pixel switching elements are the polysilicon thin film transistors in an embodiment, the invention may not be limited thereto. Embodiments of the invention may be applied to the pixel including only the oxide thin film transistors. Although some of the pixel switching elements are the N-type transistors and other pixel switching elements are the P-type transistors in the embodiment, the invention may not be limited thereto. Embodiments of the invention may be applied to the pixel including only the N-type transistors.

Figure 3:
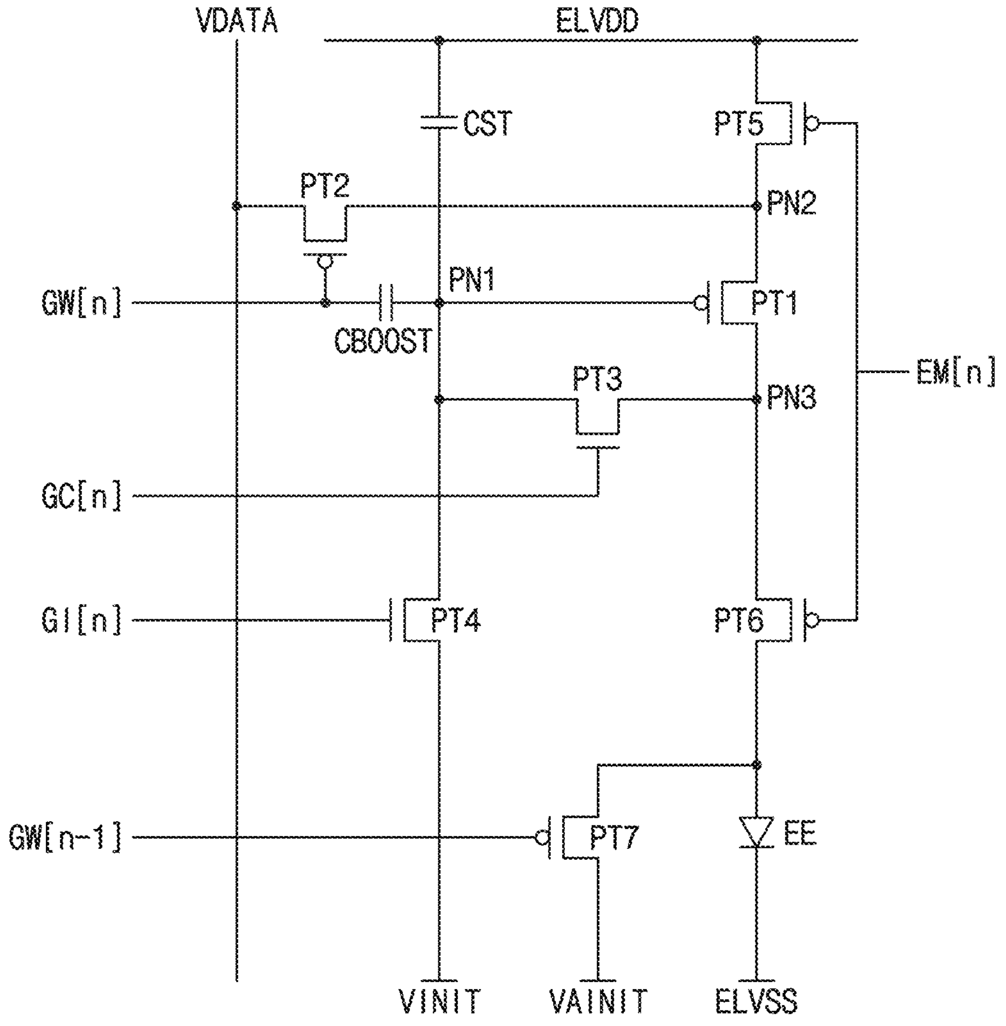
FIG. 3 is a circuit diagram illustrating an embodiment of a pixel of the display panel of FIG. 1.

FIG. 3 is a circuit diagram illustrating an embodiment of a pixel of the display panel of FIG. 1.

Referring to FIGS. 1 and 3, an embodiment of the display panel 100 includes a plurality of pixels. Each of the pixels may include a light emitting element EE.

In such an embodiment, the pixel receives a data writing gate signal GW, a compensation gate signal GC, a data initialization gate signal GI, a light emitting element initialization signal GB, the data voltage VDATA and the emission signal EM and the light emitting element EE of the pixel emits light corresponding to the level of the data voltage VDATA to display the image.

In an embodiment, the pixel may include a switching element of a first type and a switching element of a second type different from the first type. In an embodiment, for example, the switching element of the first type may be a polysilicon thin film transistor. In an embodiment, for example, the switching element of the first type may be a LTPS thin film transistor. In an embodiment, for example, the switching element of the second type may be an oxide thin film transistor. F In an embodiment, for or example, the switching element of the first type may be a P-type transistor and the switching element of the second type may be an N-type transistor.

At least one of the pixels may include first to seventh pixel switching elements PT1 to PT7 and the light emitting element EE.

The pixel may include a first pixel switching element PT1 including a control electrode connected to a first pixel node PN1, a first electrode connected to a second pixel node PN2 and a second electrode connected to a third pixel node PN3, a second pixel switching element PT2 including a control electrode that receives the data writing gate signal GW[n], a first electrode that receives the data voltage VDATA and a second electrode connected to the second pixel node PN2, the third pixel switching element PT3 including a control electrode that receives the compensation gate signal GC[n], a first electrode connected to the first pixel node PN1 and a second electrode connected to the third pixel node PN3, a fourth pixel switching element PT4 including a control electrode that receives the data initialization gate signal GI[n], a first electrode that receives an initialization voltage VINIT and a second electrode connected to the first pixel node PN1, a fifth pixel switching element PT5 including a control electrode that receives the emission signal EM[n], a first electrode that receives a pixel high power voltage ELVDD and a second electrode connected to the second pixel node PN2, a sixth pixel switching element PT6 including a control electrode that receives the emission signal EM[n], a first electrode connected to the third pixel node PN3 and a second electrode connected to an anode electrode of the light emitting element EE, a seventh pixel switching element PT7 including a control electrode that receives a data writing gate signal GW[n−1] of a previous stage as the light emitting element initialization gate signal GB[n], a first electrode that receives a light emitting element initialization voltage VAINIT and a second electrode connected to the anode electrode of the light emitting element EE and the light emitting element EE including the anode electrode and a cathode electrode that receives a pixel low power voltage ELVSS.

The pixel may further include a storage capacitor CST including a first electrode that receives the pixel high power voltage ELVDD and a second electrode connected to the first pixel node PN1 and a boosting capacitor CBOOST including a first electrode the data writing gate signal GW[n] and a second electrode connected to the first pixel node PN1.

The signal outputted from a gate signal masking circuit of the gate driver 300 may be the compensation gate signal GC[n].

In an embodiment, the light emitting element initialization gate signal GB[n] may be the data writing gate signal GW[n−1] of the previous stage. In such an embodiment where the data writing gate signal GW[n−1] of the previous stage is used as the light emitting element initialization gate signal GB[n] of the present stage, a part of the gate signal generating circuit of the gate driver 300 may be omitted. Thus, the manufacturing cost of the display apparatus may be reduced and the dead space of the display apparatus may be reduced.

In an embodiment, when the image displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In an embodiment, the third pixel switching element PT3 and the fourth pixel switching element PT4 may be the oxide thin film transistors. In such an embodiment, the first pixel switching element PT1, the second pixel switching element PT2, the fifth pixel switching element PT5, the sixth pixel switching element PT6 and the seventh pixel switching element PT7 may be the polysilicon thin film transistors.

Although some of the pixel switching elements are the oxide thin film transistors and other pixel switching elements are the polysilicon thin film transistors in an embodiment, the invention may not be limited thereto. Embodiments of the invention may be applied to the pixel including only the oxide thin film transistors. Although some of the pixel switching elements are the N-type transistors and other pixel switching elements are the P-type transistors in an embodiment, the invention may not be limited thereto. Embodiments of the invention may be applied to the pixel including only the N-type transistors.

Figure 4:
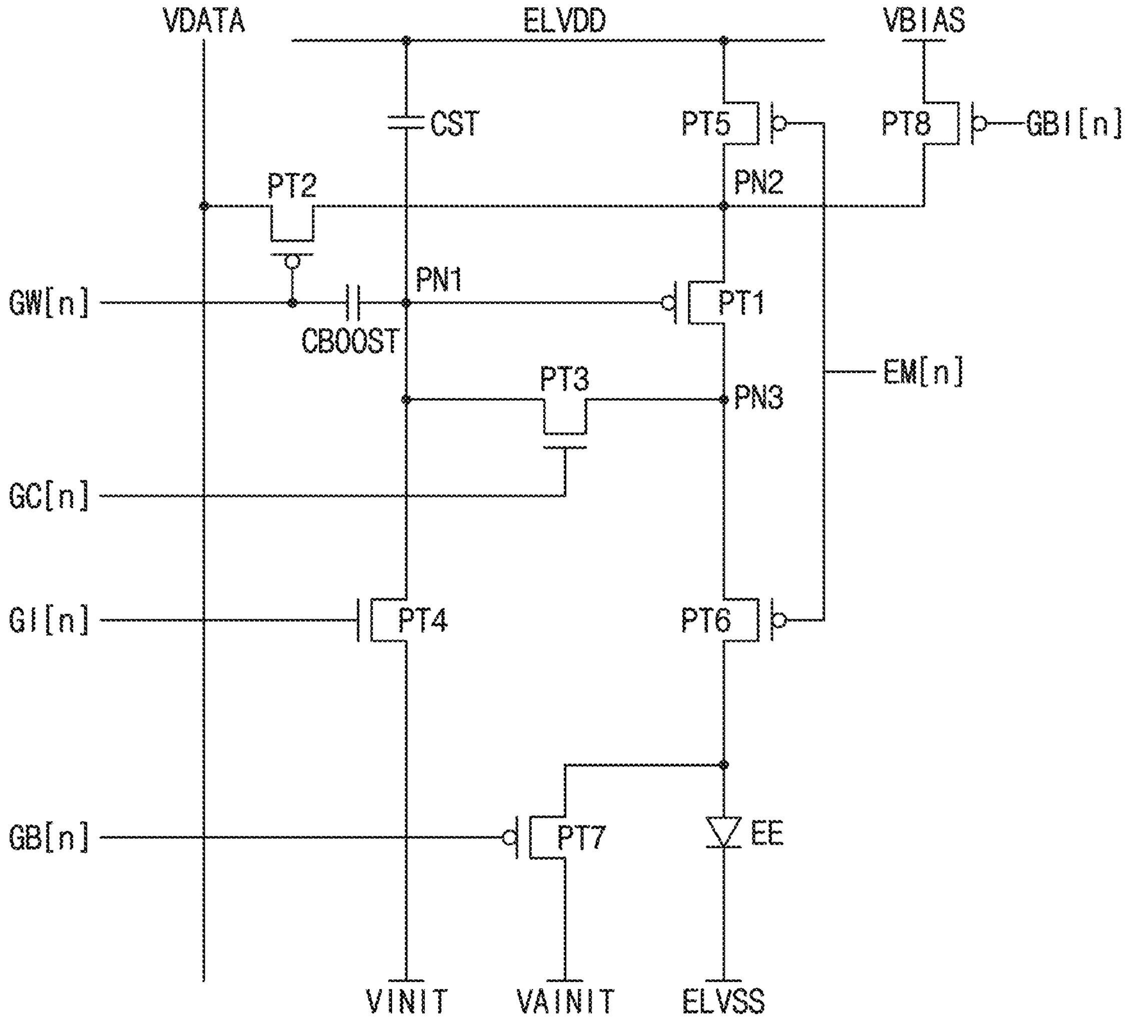
FIG. 4 is a circuit diagram illustrating an embodiment of a pixel of the display panel of FIG. 1.

FIG. 4 is a circuit diagram illustrating an embodiment of a pixel of the display panel of FIG. 1.

Referring to FIGS. 1 and 4, an embodiment of the display panel 100 includes a plurality of pixels. Each of the pixels may include a light emitting element EE.

In such an embodiment, the pixel receives a data writing gate signal GW, a compensation gate signal GC, a data initialization gate signal GI, a light emitting element initialization signal GB, a bias gate signal GBI, the data voltage VDATA and the emission signal EM and the light emitting element EE of the pixel emits light corresponding to the level of the data voltage VDATA to display the image.

In an embodiment, the pixel may include a switching element of a first type and a switching element of a second type different from the first type. In an embodiment, for example, the switching element of the first type may be a polysilicon thin film transistor. In an embodiment, for example, the switching element of the first type may be a LTPS thin film transistor. In an embodiment, for example, the switching element of the second type may be an oxide thin film transistor. In an embodiment, for example, the switching element of the first type may be a P-type transistor and the switching element of the second type may be an N-type transistor.

At least one of the pixels may include first to eighth pixel switching elements PT1 to PT8 and the light emitting element EE.

The pixel may include a first pixel switching element PT1 including a control electrode connected to a first pixel node PN1, a first electrode connected to a second pixel node PN2 and a second electrode connected to a third pixel node PN3, a second pixel switching element PT2 including a control electrode that receives the data writing gate signal GW[n], a first electrode that receives the data voltage VDATA and a second electrode connected to the second pixel node PN2, the third pixel switching element PT3 including a control electrode that receives the compensation gate signal GC[n], a first electrode connected to the first pixel node PN1 and a second electrode connected to the third pixel node PN3, a fourth pixel switching element PT4 including a control electrode that receives the data initialization gate signal GI[n], a first electrode that receives an initialization voltage VINIT and a second electrode connected to the first pixel node PN1, a fifth pixel switching element PT5 including a control electrode that receives the emission signal EM[n], a first electrode that receives a pixel high power voltage ELVDD and a second electrode connected to the second pixel node PN2, a sixth pixel switching element PT6 including a control electrode that receives the emission signal EM[n], a first electrode connected to the third pixel node PN3 and a second electrode connected to an anode electrode of the light emitting element EE, a seventh pixel switching element PT7 including a control electrode that receives the light emitting element initialization gate signal GB[n], a first electrode that receives a light emitting element initialization voltage VAINIT, an eighth pixel switching element PT8 including a control electrode that receives the bias gate signal GBI[n], a first electrode that receives a bias voltage VBIAS and a second electrode connected to the second pixel node PN2 and the light emitting element EE including the anode electrode and a cathode electrode that receives a pixel low power voltage ELVSS.

The pixel may further include a storage capacitor CST including a first electrode that receives the pixel high power voltage ELVDD and a second electrode connected to the first pixel node PN1 and a boosting capacitor CBOOST including a first electrode the data writing gate signal GW[n] and a second electrode connected to the first pixel node PN1.

The signal outputted from a gate signal masking circuit of the gate driver 300 may be the compensation gate signal GC[n].

In an embodiment, when the image displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In an embodiment, the third pixel switching element PT3 and the fourth pixel switching element PT4 may be the oxide thin film transistors. In such an embodiment, the first pixel switching element PT1, the second pixel switching element PT2, the fifth pixel switching element PT5, the sixth pixel switching element PT6 and the seventh pixel switching element PT7 may be the polysilicon thin film transistors.

Although some of the pixel switching elements are the oxide thin film transistors and other pixel switching elements are the polysilicon thin film transistors in an embodiment, the invention may not be limited thereto. Embodiments of the invention may be applied to the pixel including only the oxide thin film transistors. Although some of the pixel switching elements are the N-type transistors and other pixel switching elements are the P-type transistors in an embodiment, the invention may not be limited thereto. Embodiments of the invention may be applied to the pixel including only the N-type transistors.

Figure 5:
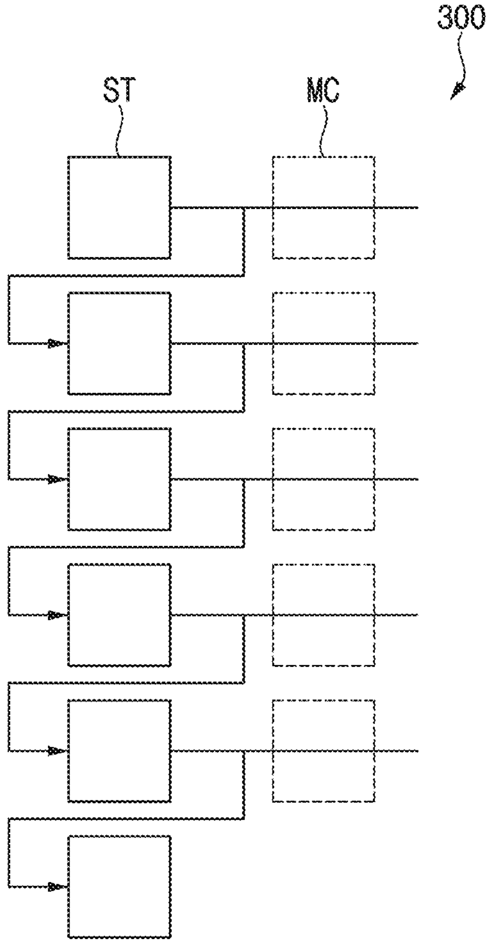
FIG. 5 is a conceptual diagram illustrating an embodiment of a gate driver of FIG. 1.
Figure 6:
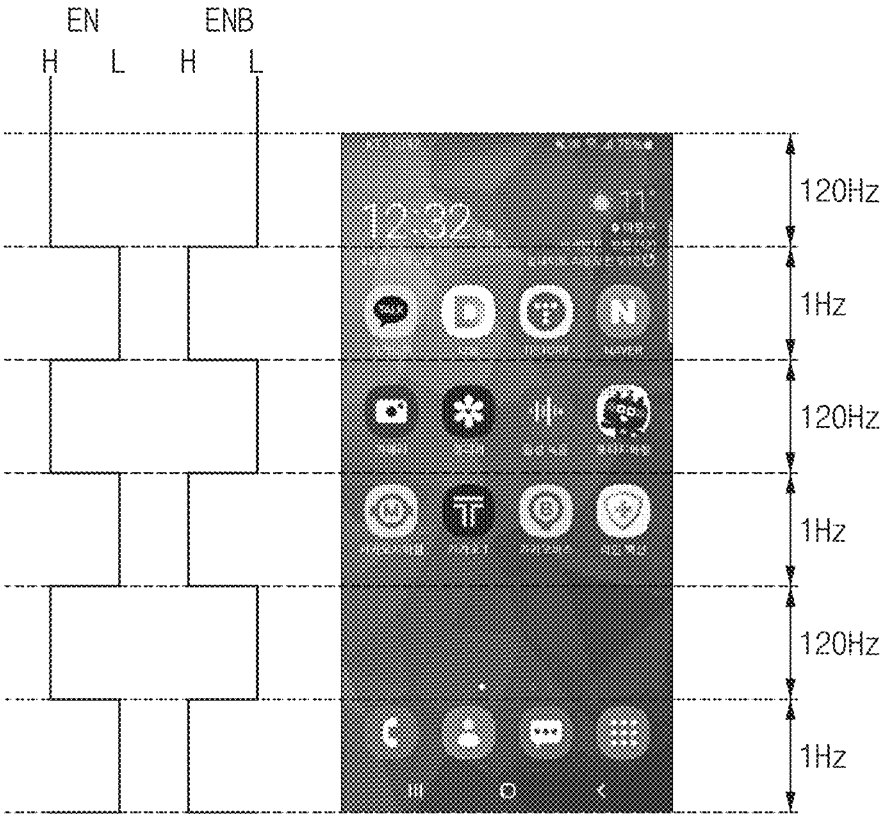
FIG. 6 is a conceptual diagram illustrating a first enable signal and a second enable signal applied to the gate driver of FIG. 1 according to driving frequencies of portions of the display panel of FIG. 1.
Figure 7:
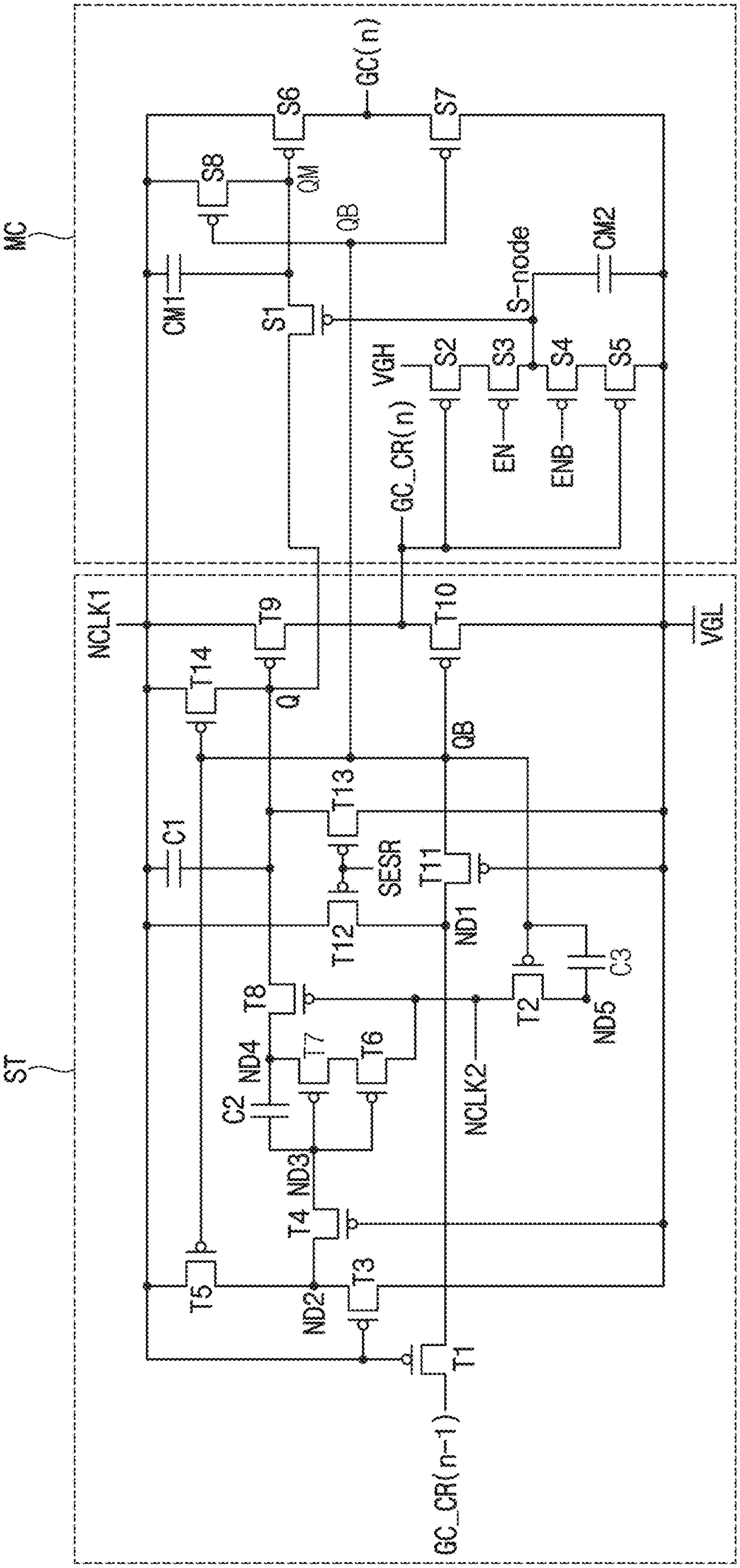
FIG. 7 is a circuit diagram illustrating a carry generator and a gate signal masking circuit of the gate driver of FIG. 1.

FIG. 5 is a conceptual diagram illustrating the gate driver 300 of FIG. 1. FIG. 6 is a conceptual diagram illustrating a first enable signal EN and a second enable signal ENB applied to the gate driver 300 of FIG. 1 according to driving frequencies of portions of the display panel 100 of FIG. 1. FIG. 7 is a circuit diagram illustrating a carry generator ST and a gate signal masking circuit MC of the gate driver 300 of FIG. 1.

Referring to FIGS. 1 to 7, an embodiment of the gate driver 300 may include the carry generator ST that generates a carry signal GC_CR(n) based on a previous carry signal GC_CR(n−1), a first clock signal NCLK1, a second clock signal NCLK2 and a low power voltage VGL and a gate signal masking circuit MC connected to the carry generator ST.

In an embodiment, the gate signal masking circuit MC may output or not output (i.e., stop outputting) a gate pulse based on the carry signal GC_CR(n), the first enable signal EN and the second enable signal ENB. In such an embodiment, the gate signal masking circuit MC may selectively output the gate pulse based on the carry signal GC_CR(n), the first enable signal EN and the second enable signal ENB.

In an embodiment, for example, when the first enable signal EN has a high level H and the second enable signal ENB has a low level L, the gate signal masking circuit MC may output the gate pulse.

In an embodiment, for example, when the first enable signal EN has a low level L and the second enable signal ENB has a high level H, the gate signal masking circuit MC may not output the gate pulse.

As shown in FIG. 6, the gate driver 300 may output the gate pulse at a high frequency (e.g., 120 Hz) for a portion of the display panel 100 where a high frequency driving is desired or determined, and may output a gate pulse at a low frequency (e.g., 1 Hz) for a portion of the display panel 100 where a low frequency driving is described or determined in response to the first enable signal EN and the second enable signal ENB.

The gate signal masking circuit MC may mask an output of the gate pulse to output the gate pulse in the low frequency (e.g., 1 Hz). The carry generator ST transfers the carry signal to a next stage regardless of the operation of the gate signal masking circuit MC masking the output of the gate pulse so that the gate driver 300 may support the multiple division of the driving frequency.

In an embodiment, as shown in FIG. 7, the gate signal masking circuit MC may include a first switching element S1 including a control electrode connected to a masking control node S-node, a first electrode connected to a first control node Q and a second electrode connected to a third control node QM, a second switching element S2 including a control electrode that receives the carry signal GC_CR(n), a first electrode that receives a masking power signal (e.g., a high power voltage VGH) and a second electrode connected to a first intermediate node, a third switching element S3 including a control electrode that receives the first enable signal EN, a first electrode connected to the first intermediate node and a second electrode connected to the masking control node S-node, a fourth switching element S4 including a control electrode that receives the second enable signal ENB, a first electrode connected to the masking control node S-node and a second electrode connected to a second intermediate node and a fifth switching element S5 including a control electrode that receives the carry signal GC_CR(n), a first electrode connected to the second intermediate node and a second electrode that receives a low power voltage VGL.

The gate signal masking circuit MC may further include a sixth switching element S6 including a control electrode connected to the third control node QM, a first electrode that receives the first clock signal NCLK1 and a second electrode connected to a gate output node, a seventh switching element S7 including a control electrode connected to a second control node QB, a first electrode connected to the gate output node and a second electrode that receives the low power voltage VGL and an eighth switching element S8 including a control electrode connected to the second control node QB, a first electrode that receives the first clock signal NCLK1 and a second electrode connected to the third control node QM.

The gate signal masking circuit MC may further include a first masking capacitor CM1 including a first electrode that receives the first clock signal NCLK1 and a second electrode connected to the third control node QM and a second masking capacitor CM2 including a first electrode connected to the masking control node S-node and a second electrode that receives the low power voltage VGL.

In an embodiment, the masking power signal may be the high power voltage VGH. The high power voltage VGH may be a direct-current (DC) voltage.

The carry generator ST may include a first gate switching element T1 including a control electrode that receives the first clock signal NCLK1, a first electrode that receives the previous carry signal GC_CR(n−1) and a second electrode connected to a first node ND1, a second gate switching element T2 including a control electrode connected to the second control node QB, a first electrode that receives the second clock signal NCLK2 and a second electrode connected to a fifth node ND5, a third gate switching element T3 including a control electrode that receives the first clock signal NCLK1, a first electrode connected to a second node ND2 and a second electrode that receives the low power voltage VGL, a fourth gate switching element T4 including a control electrode that receives the low power voltage VGL, a first electrode connected to the second node ND2 and a second electrode connected to a third node ND3, a fifth gate switching element T5 including a control electrode connected to the second control node QB, a first electrode that receives the first clock signal NCLK1 and a second electrode connected to the second node ND2, a sixth gate switching element T6 including a control electrode connected to the third node ND3, a first electrode that receives the second clock signal NCLK2 and a second electrode connected to a third intermediate node, a seventh gate switching element T7 including a control electrode connected to the third node ND3, a first electrode connected to a fourth node ND4 and a second electrode connected to the third intermediate node, an eighth gate switching element T8 including a control electrode that receives the second clock signal NCLK2, a first electrode connected to the fourth node ND4 and a second electrode connected to the first control node Q, a ninth gate switching element T9 including a control electrode connected to the first control node Q, a first electrode that receives the first clock signal NCLK1 and a second electrode connected to a carry output node, a tenth gate switching element T10 including a control electrode connected to the second control node QB, a first electrode connected to the carry output node and a second electrode that receives the low power voltage VGL, an eleventh switching element T11 including a control electrode that receives the low power voltage VGL, a first electrode connected to the first node ND1 and a second electrode connected to the second control node QB, and a fourteenth switching element T14 including a control electrode connected to the second control node QB, a first electrode that receives the first clock signal NCLK1 and a second electrode connected to the first control node Q.

The carry generator ST may further include a twelfth gate switching element T12 including a control electrode that receives a reset signal SESR, a first electrode that receives the first clock signal NCLK1 and a second electrode connected to the first node ND1, and a thirteenth gate switching element T13 including a control electrode that receives the reset signal SESR, a first electrode connected to the first control node Q and a second electrode connected to the low power voltage VGL.

The carry generator ST may further include a first capacitor C1 including a first electrode that receives the first clock signal NCLK1 and a second electrode connected to the first control node Q, a second capacitor C2 including a first electrode connected to the third node ND3 and a second electrode connected to the fourth node ND4, and a third capacitor C3 including a first electrode connected to the fifth node ND5 and a second electrode connected to the second control node QB.

In an embodiment, for example, the control electrode of the tenth gate switching element T10 of the carry generator ST and the control electrode of the fourteenth gate switching element T14 of the carry generator ST may be connected to the control electrode of the seventh switching element S7 of the gate signal masking circuit MC and the control electrode of the eighth switching element S8 of the gate signal masking circuit MC.

In an embodiment, for example, the control electrode of the ninth gate switching element T9 of the carry generator ST may be connected to the first electrode of the first switching element S1 of the gate signal masking circuit MC.

In an embodiment, the previous carry signal GC_CR(n−1) may be a carry signal of an immediately previous stage of a stage. However, the invention may not be limited thereto. Alternatively, the previous carry signal GC_CR(n−1) may be a carry signal of one of previous stages of the stage.

Figure 8:
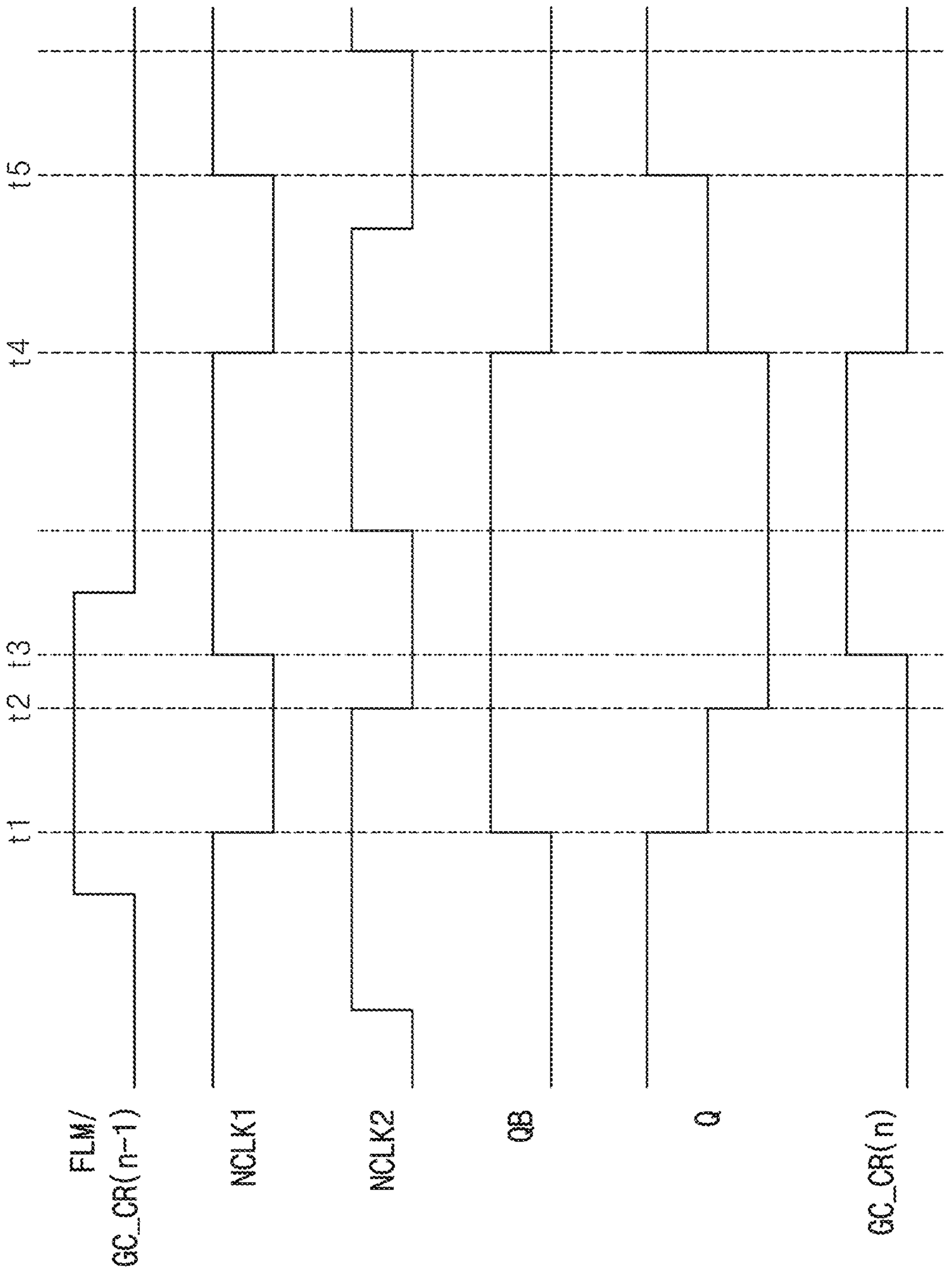
FIG. 8 is a timing diagram illustrating input signals, node signals and an output signal of the carry generator of FIG. 7.
Figure 9:
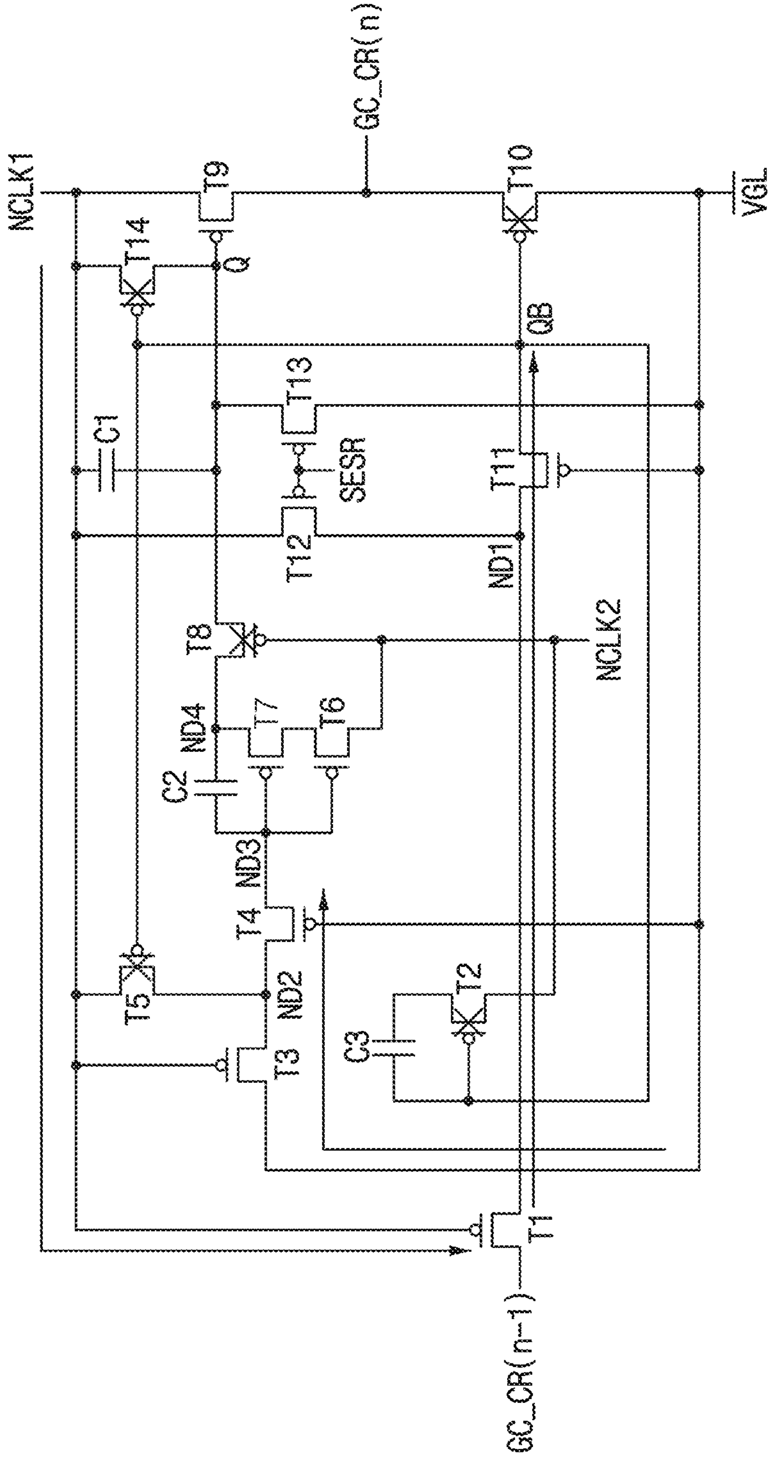
FIG. 9 is a circuit diagram illustrating an operation of the carry generator of FIG. 7 in a first time point of FIG. 8.
Figure 10:
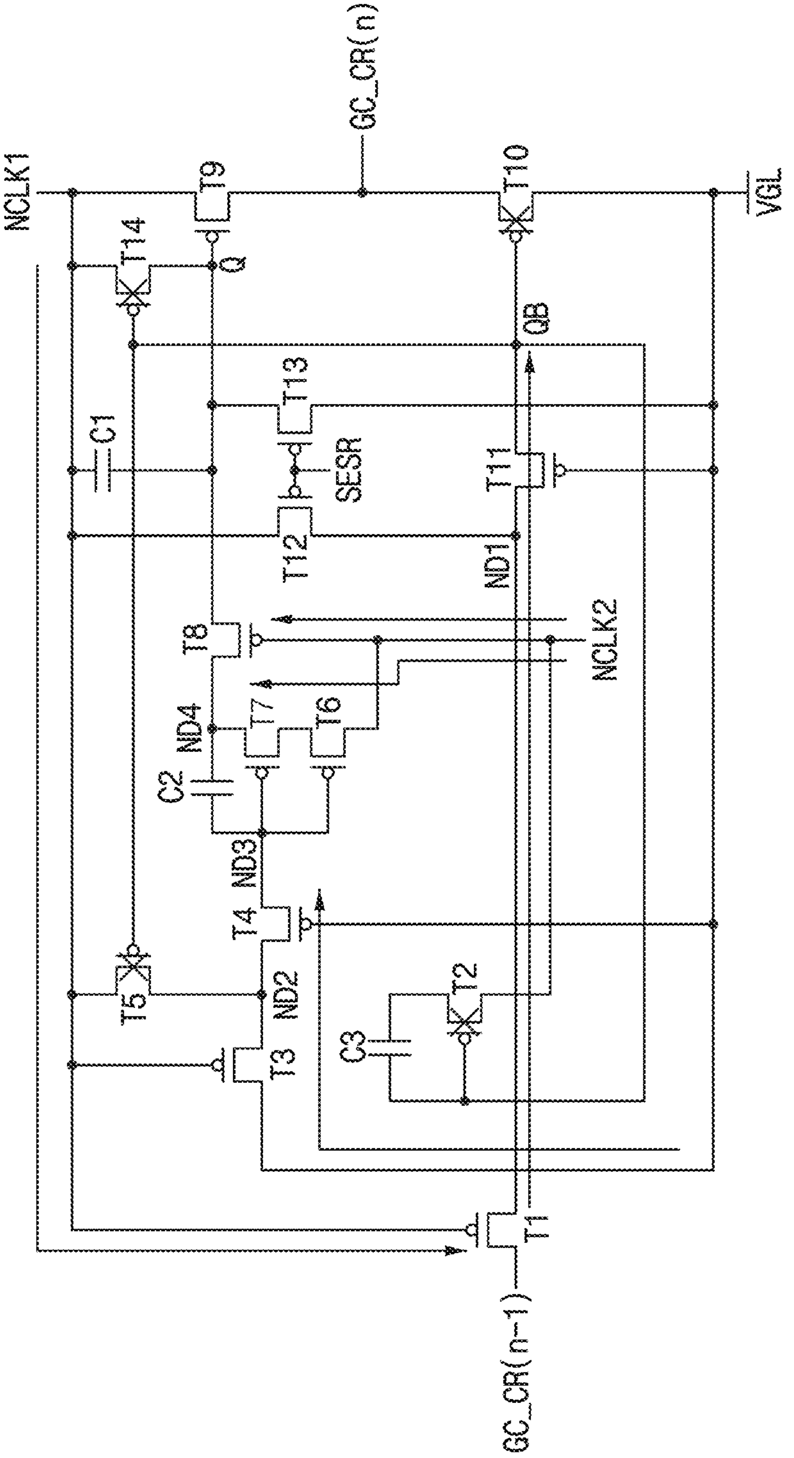
FIG. 10 is a circuit diagram illustrating an operation of the carry generator of FIG. 7 in a second time point of FIG. 8.
Figure 11:
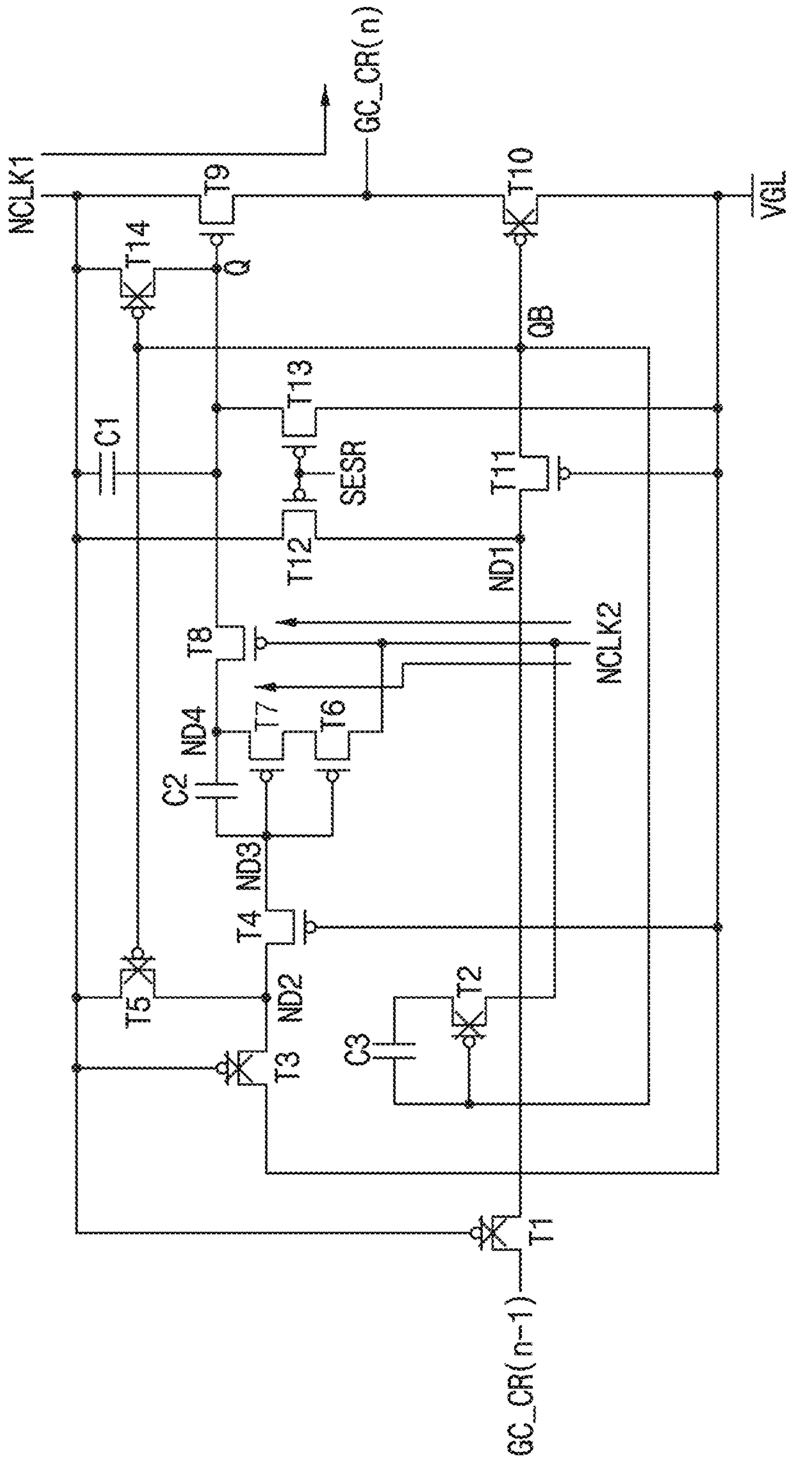
FIG. 11 is a circuit diagram illustrating an operation of the carry generator of FIG. 7 in a third time point of FIG. 8.
Figure 12:
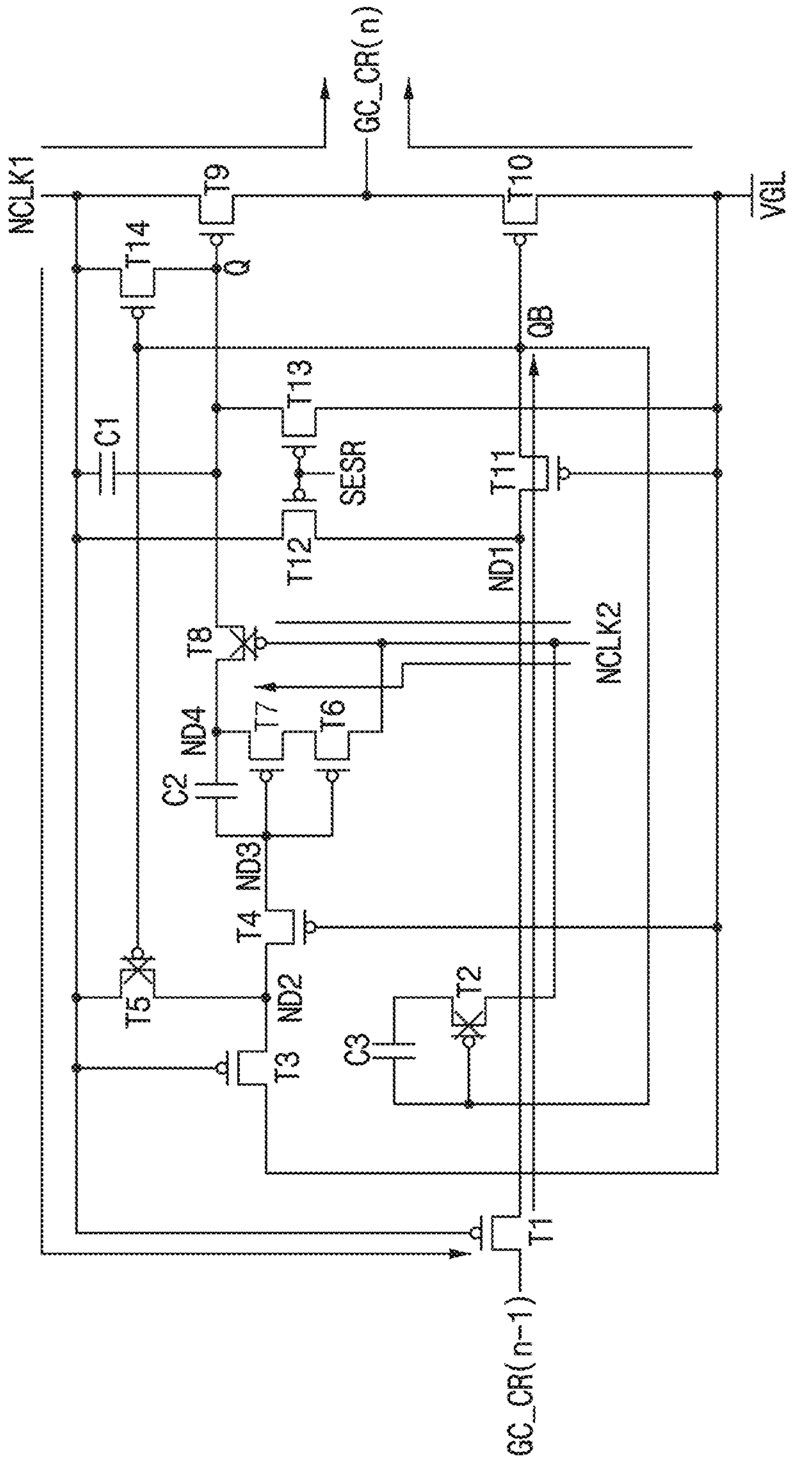
FIG. 12 is a circuit diagram illustrating an operation of the carry generator of FIG. 7 in a fourth time point of FIG. 8.
Figure 13:
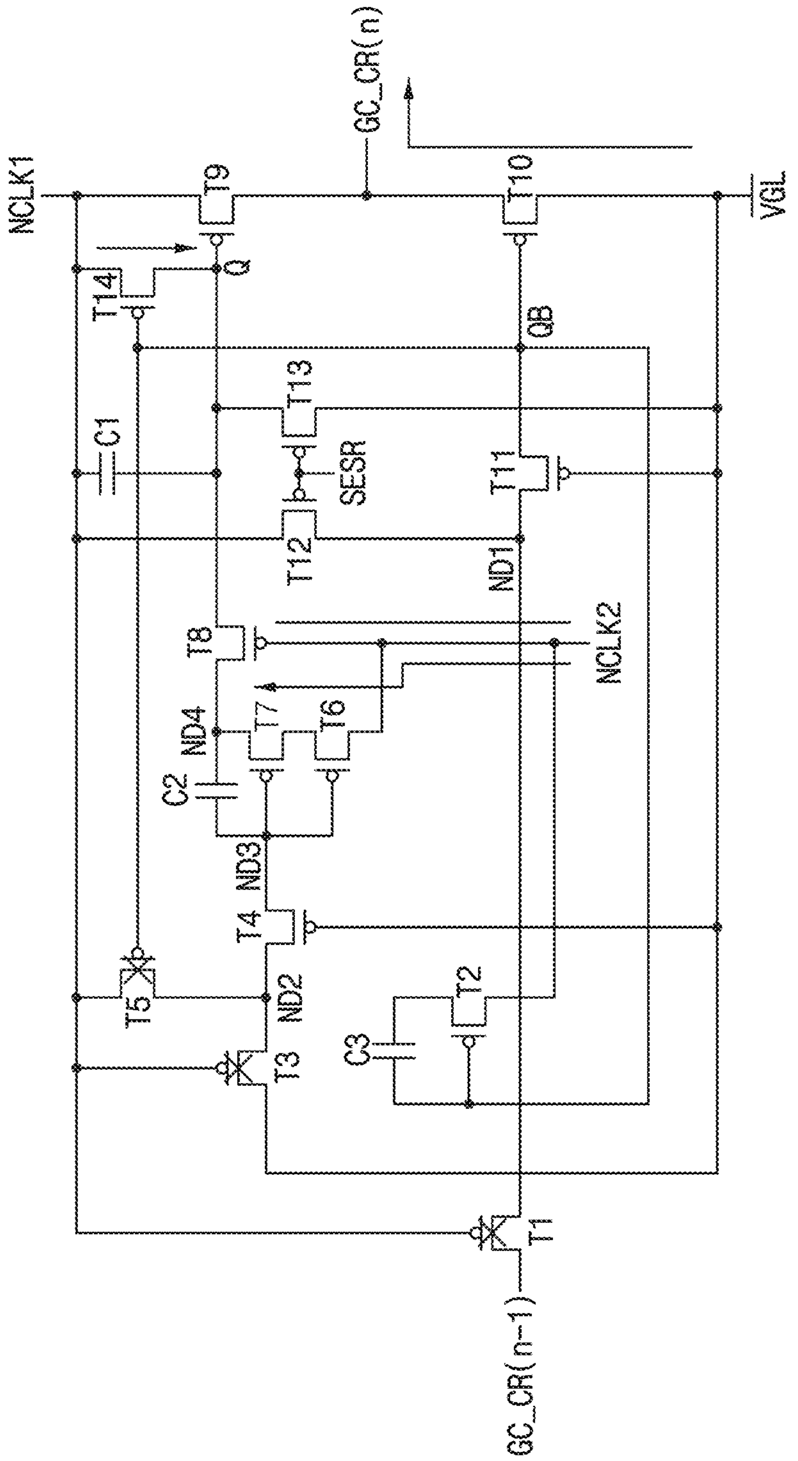
FIG. 13 is a circuit diagram illustrating an operation of the carry generator of FIG. 7 in a fifth time point of FIG. 8.

FIG. 8 is a timing diagram illustrating input signals, node signals and an output signal of the carry generator ST of FIG. 7. FIG. 9 is a circuit diagram illustrating an operation of the carry generator ST of FIG. 7 in a first time point t1 of FIG. 8. FIG. 10 is a circuit diagram illustrating an operation of the carry generator ST of FIG. 7 in a second time point t2 of FIG. 8. FIG. 11 is a circuit diagram illustrating an operation of the carry generator ST of FIG. 1 in a third time point t3 of FIG. 8. FIG. 12 is a circuit diagram illustrating an operation of the carry generator ST of FIG. 7 in a fourth time point t4 of FIG. 8. FIG. 13 is a circuit diagram illustrating an operation of the carry generator ST of FIG. 7 in a fifth time point t5 of FIG. 8.

Hereinafter, the operation of the carry generator ST will be described in detail referring to FIGS. 8 to 13.

As shown in FIGS. 8 and 9, a vertical start signal FLM or the previous carry signal GC_CR(n−1) may have an active level (e.g., a high level) and the first clock signal NCLK1 may have a low level at the first time point t1.

At the first time point t1, the voltage of the second control node QB may have a high level. At the first time point t1, the first clock signal NCLK1 is coupled through the first capacitor C1 so that the voltage of the first control node Q may be changed to a first low level.

At the first time point t1, the third gate switching element T3 and the fourth gate switching element T4 are turned on and the second capacitor C2 may be charged.

As shown in FIGS. 8 and 10, the second clock signal NCLK2 falls from a high level to a low level at the second time point t2.

At the second time point t2, the voltage of the first control node Q may be changed to a second low level by a boosting of the second capacitor C2.

At the second time point t2, the ninth gate switching element T9 is in a turned-on state and the first clock signal has a low level so that the low level is outputted as the carry signal GC_CR(n).

At the second time point t2, the low power voltage VGL is charged at the first capacitor C1.

As shown in FIGS. 8 and 11, the first clock signal NCLK1 rises from the low level to a high level at a third time point t3.

When the first clock signal NCLK1 rises from the low level to the high level in a turned-on state of the ninth gate switching element T9, the high level is outputted as the carry signal GC_CR(n).

As shown in FIGS. 8 and 12, the first clock signal NCLK1 falls from the high level to the low level at the fourth time point t4.

When the first clock signal NCLK1 falls to the low level at the fourth time point t4, the vertical start signal FLM or the previous carry signal GC_CR(n−1) is in a low state in the fourth time point t4 so that the voltage at the second control node QB may become the low level.

When the second control node QB is in the low level in the fourth time point t4, the tenth gate switching element T10 is turned on so that the low level of the low power voltage VGL is outputted as the carry signal GC_CR(n) by the tenth gate switching element T10.

In addition, in the fourth time point t4, the fourteenth gate switching element T14 is turned on by the voltage of the second control node QB and the ninth gate switching element T9 is turned on by the first clock signal NCLK1 so that a falling edge of the first clock signal NCLK1 is outputted as the carry signal GC_CR(n).

As shown in FIGS. 8 and 13, the first clock signal NCLK1 rises from the low level to the high level at the fifth time point t5.

When the first clock signal NCLK1 rises from the low level to the high level at the fifth time point t5, the voltage of the second control node QB maintains the low level. The tenth gate switching element T10 is turned on by the low level of the voltage of the second control node QB in the fifth time point t5, the low level of the low power voltage VGL is outputted as the carry signal GC_CR(n) by the tenth gate switching element T10.

In addition, the fourteenth gate switching element T14 is turned on by the low level of the voltage of the second control node QB in the fifth time point t5, the voltage of the first control node Q becomes a high state at a rising edge of the first clock signal NCLK1 by the fourteenth gate switching element T14.

When the reset signal SESR is applied to the twelfth gate switching element T12 and the thirteenth gate switching element T13, the twelfth gate switching element T12 and the thirteenth gate switching element T13 are turned on so that the voltage of the second control node QB may be initialized by the second control node QB and the voltage of the first control node Q may be initialized by the first control node Q. When the reset signal SESR is applied, the gate driver 300 may output the gate signal GC(n) having the high level.

Figure 14:
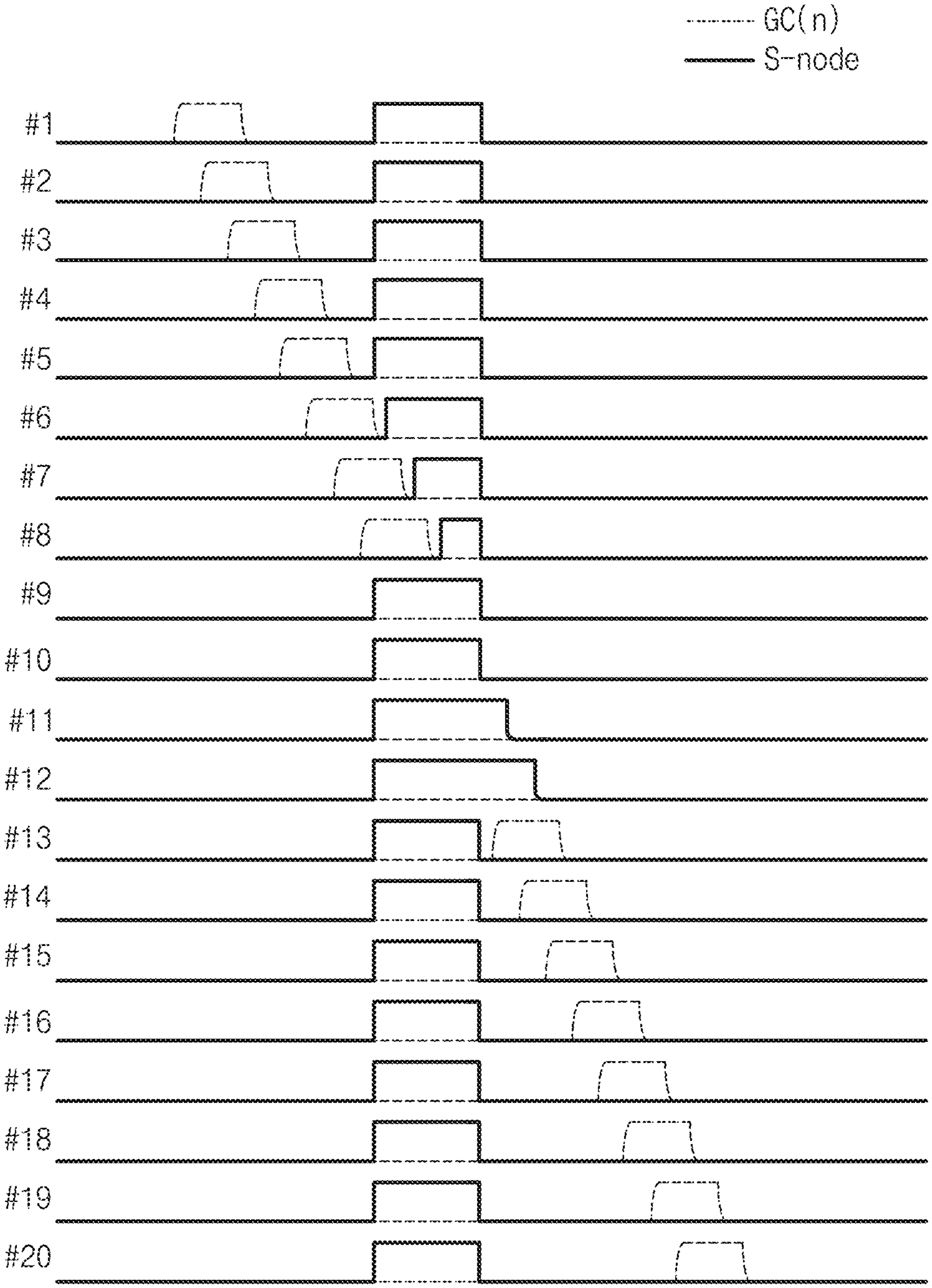
FIG. 14 is a timing diagram illustrating a signal of a masking control node and a gate output signal of the gate signal masking circuit of FIG. 7.
Figure 15:
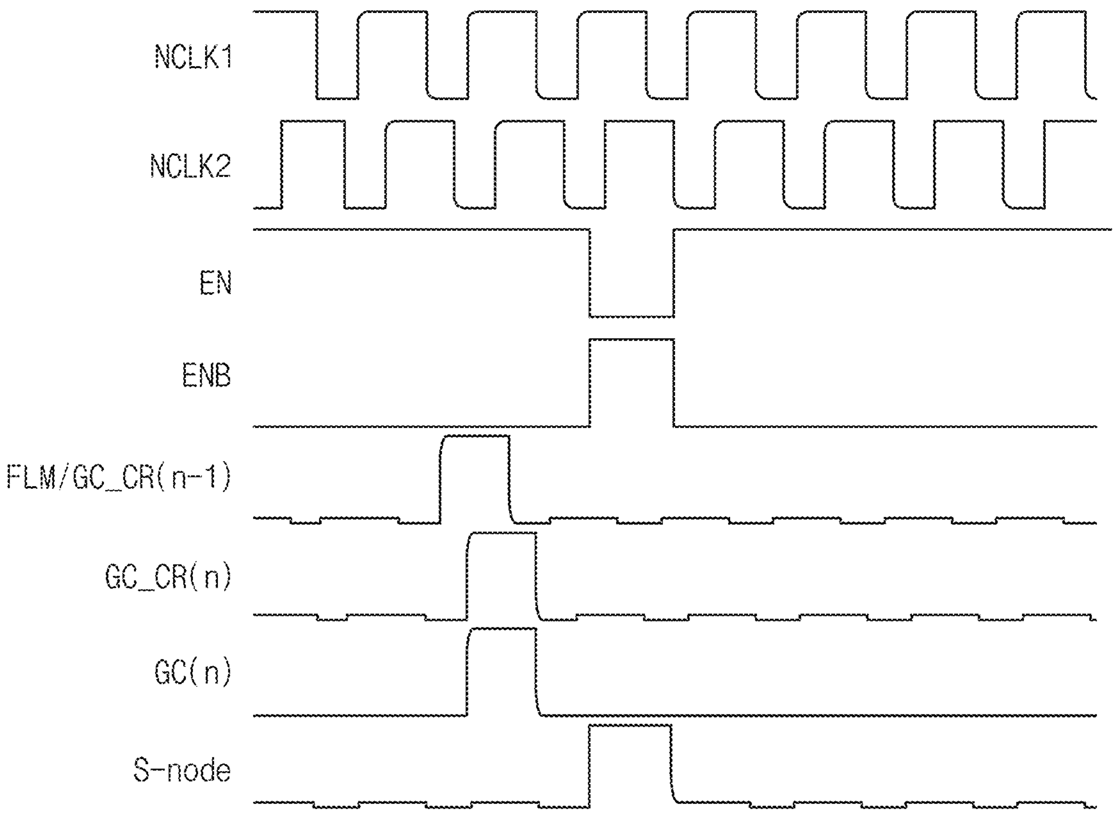
FIG. 15 is a timing diagram illustrating input signals, a node signal and output signals of the carry generator and the gate signal masking circuit of FIG. 7 in a first case.
Figure 16:
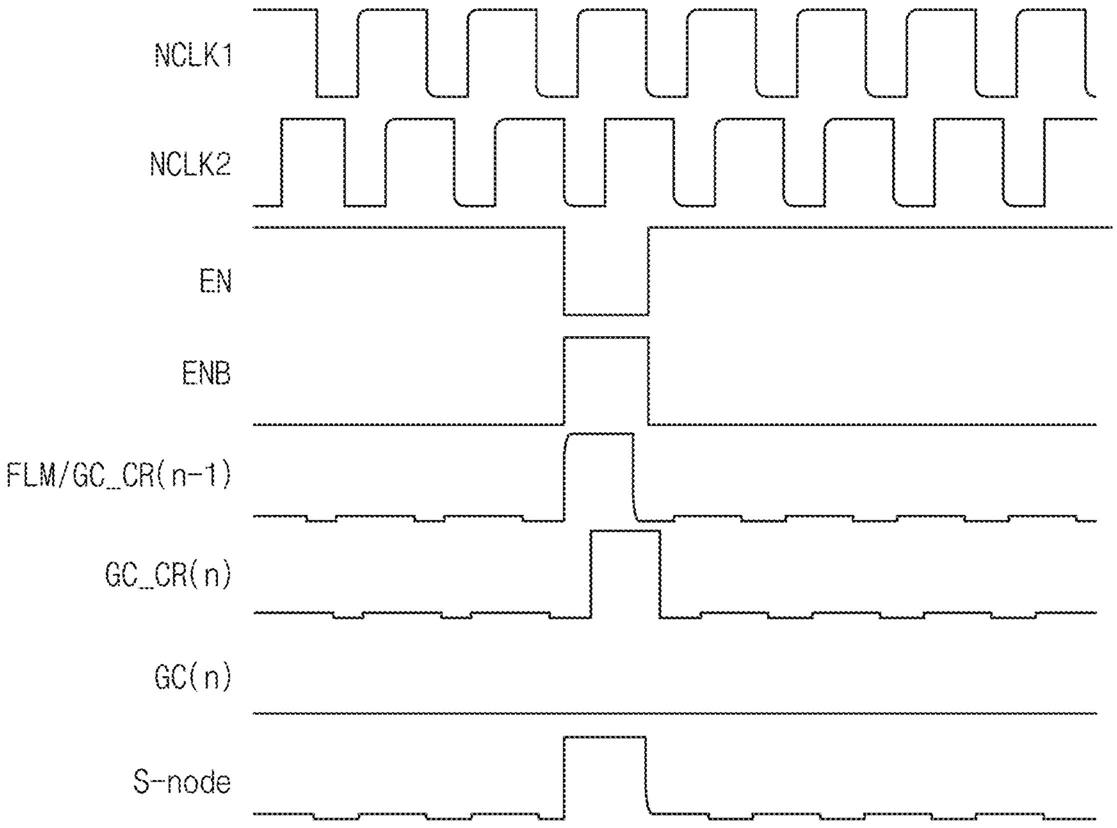
FIG. 16 is a timing diagram illustrating input signals, a node signal and output signals of the carry generator and the gate signal masking circuit of FIG. 7 in a second case.
Figure 17:
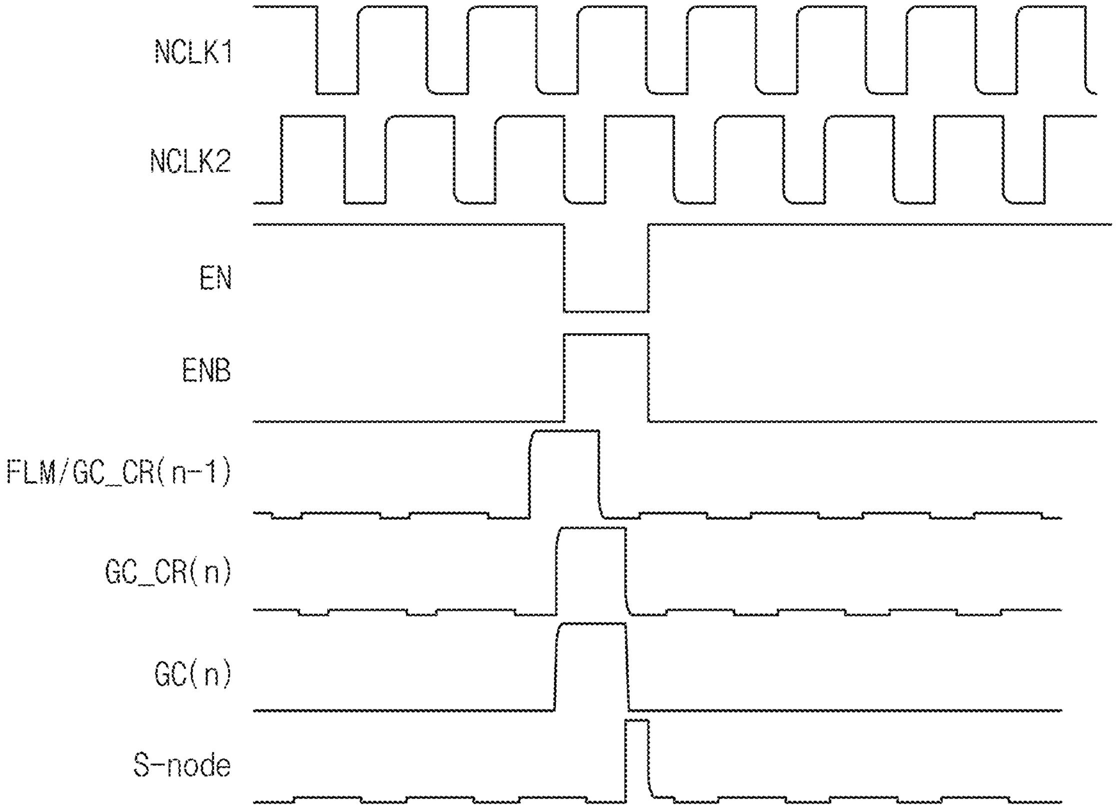
FIG. 17 is a timing diagram illustrating input signals, a node signal and output signals of the carry generator and the gate signal masking circuit of FIG. 7 in a third case.
Figure 18:
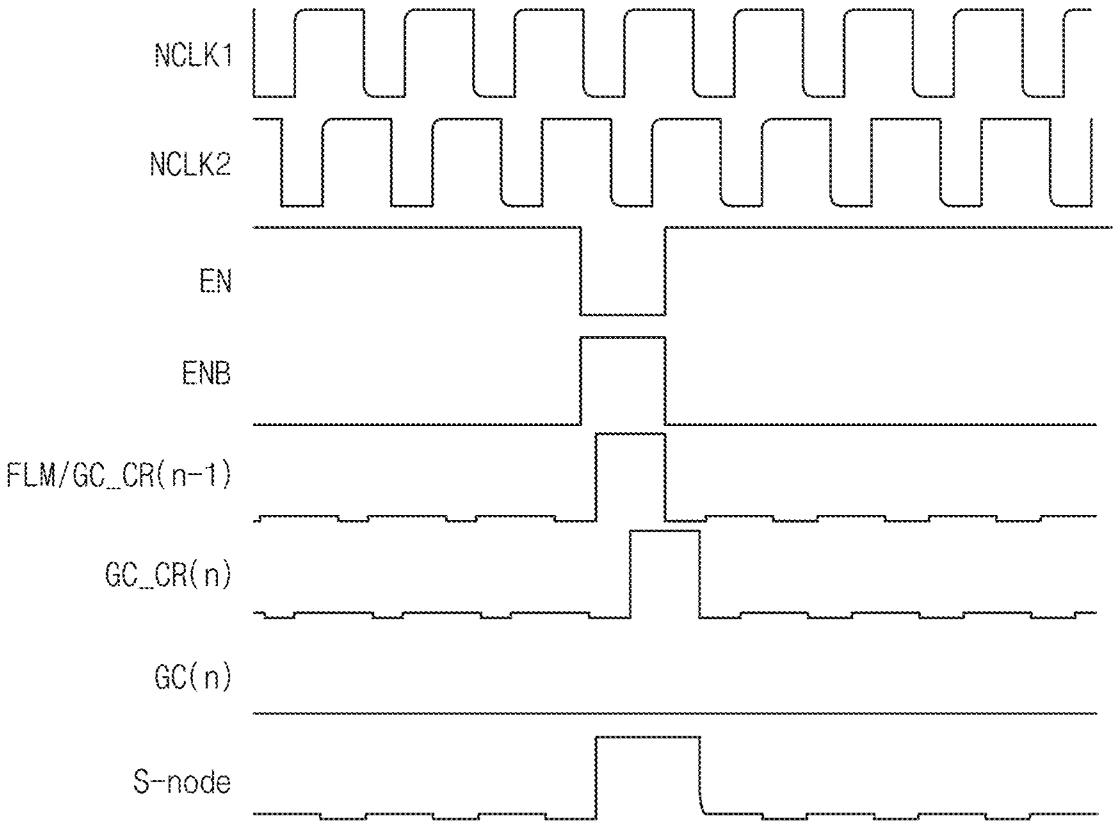
FIG. 18 is a timing diagram illustrating input signals, a node signal and output signals of the carry generator and the gate signal masking circuit of FIG. 7 in a fourth case.

FIG. 14 is a timing diagram illustrating a signal of a masking control node S-node and a gate output signal GC(n) of the gate signal masking circuit MC of FIG. 7. FIG. 15 is a timing diagram illustrating input signals, a node signal and output signals of the carry generator ST and the gate signal masking circuit MC of FIG. 7 in a first case. FIG. 16 is a timing diagram illustrating input signals, a node signal and output signals of the carry generator ST and the gate signal masking circuit MC of FIG. 7 in a second case. FIG. 17 is a timing diagram illustrating input signals, a node signal and output signals of the carry generator ST and the gate signal masking circuit MC of FIG. 7 in a third case. FIG. 18 is a timing diagram illustrating input signals, a node signal and output signals of the carry generator ST and the gate signal masking circuit MC of FIG. 7 in a fourth case.

Hereinafter, the operation of the gate signal masking circuit MC will be described in detail referring to FIGS. 14 to 18.

In an embodiment, as shown in FIG. 7, the gate signal masking circuit MC may include eight transistors S1 to S8 and two capacitors CM1 and CM2.

The gate driver 300 may use an output of the carry generator ST as the carry signal GC_CR(n) and an output of the gate signal masking circuit MC as the gate signal GC(n) for the multiple division of the driving frequency.

The first control node Q, the second control node QB and the carry output node GC_CR may be connected to the gate signal masking circuit MC.

As the state of the masking control node S-node and the state of the first switching element S1 are changed based on the first enable signal EN, the second enable signal ENB and a frequency control signal, the gate signal masking circuit MC operates based thereon.

FIG. 14 illustrates a case in which the gate signal GC(n) is not outputted from ninth to twelfth gate lines (#9 to #12) among twenty gate lines (#1 to #20) due to a gate signal masking operation.

In this case, first to eighth gate lines (#1 to #8) and thirteenth to twentieth gate lines (#13 to #20) may output gate pulses, and the ninth to twelfth gate lines (#9 to #12) may not output gate pulses.

As shown in FIG. 14, on the line where the gate pulse is not outputted, the masking control node S-node may maintain a high level. When the masking control node S-node maintains the high level, the first switching element S1 may be turned off and the sixth switching element S6 may be turned off so that the gate output node may not output the gate pulse.

The sixth switching element S6 of the gate signal masking circuit MC operates similarly to the ninth gate switching element T9 of the carry generator ST. The ninth gate switching element T9 of the carry generator ST outputs the first clock signal NCLK1 as the carry signal GC_CR(n) in response to the first control node Q. The sixth gate switching element S6 of the gate signal masking circuit MC outputs the first clock signal NCLK1 as the gate signal GC(n) in response to the third control node QM.

The seventh switching element S7 of the gate signal masking circuit MC operates similarly to the tenth gate switching element T10 of the carry generator ST. The tenth gate switching element T10 of the carry generator ST outputs the low power voltage VGL as the low level of the carry signal GC_CR(n) in response to the voltage of the second control node QB. The seventh switching element S7 of the gate signal masking circuit MC outputs the low power voltage VGL as the low level of the gate signal GC(n) in response to the voltage of the second control node QB.

The eighth switching element S8 of the gate signal masking circuit MC operates similarly to the fourteenth gate switching element T14 of the carry generator ST. The fourteenth gate switching element T14 of the carry generator ST outputs the first clock signal NCLK1 to the first control node Q in response to the voltage of the second control node QB. The eighth gate switching element S8 of the gate signal masking circuit MC outputs the first clock signal NCLK1 to the third control node QM in response to the voltage of the second control node QB.

The voltage of the masking control node S-node may be determined by operations of the second to fifth switching elements S2 to S5 of the gate signal masking circuit MC.

In an embodiment, for example, when the carry signal GC_CR(n) has the low level and the first enable signal EN has the low level, the second switching element S2 and the third switching element S3 of the gate signal masking circuit MC are turned on so that the high power voltage VGH may be applied to the masking control node S-node.

The second enable signal ENB may be an inverted signal of the first enable signal EN. Thus, when the third switching element S3 of the gate signal masking circuit MC is turned on in response to the first enable signal EN, the fourth switching element S4 of the gate signal masking circuit MC may be turned off in response to the second enable signal ENB.

In an embodiment, for example, when the carry signal GC_CR(n) has the low level and the second enable signal ENB has the low level, the fourth switching element S4 and the fifth switching element S5 of the gate signal masking circuit MC are turned on so that the low power voltage VGL may be applied to the masking control node S-node.

The second enable signal ENB may be an inverted signal of the first enable signal EN. Thus, when the fourth switching element S4 of the gate signal masking circuit MC is turned on in response to the second enable signal ENB, the third switching element S3 of the gate signal masking circuit MC may be turned off in response to the first enable signal EN.

When the carry signal GC_CR(n) has the high level, the second switching element S2 and the fifth switching element S5 of the gate signal masking circuit MC are turned off so that the masking control node S-node may maintain a previous state regardless of the state of the first enable signal EN and the state of the second enable signal ENB.

FIG. 15 illustrates a case where the first enable signal EN has an inactive level (e.g., a high level) in all periods in which the carry signal GC_CR(n) has an active level (e.g., a high level).

When the first enable signal EN has the inactive level in all periods in which the carry signal GC_CR(n) has the active level, the gate signal masking circuit MC may output the gate pulse.

FIG. 16 illustrates a case where the first enable signal EN has an active level (e.g., a low level) in all periods in which the carry signal GC_CR(n) has the active level (e.g., a high level).

When the first enable signal EN has the active level in all periods in which the carry signal GC_CR(n) has the active level, the gate signal masking circuit MC may not output the gate pulse.

FIG. 17 illustrates a case where the first enable signal EN is changed from the inactive level (e.g., a high level) to the active level (e.g., a low level) during a period in which the carry signal GC_CR(n) has the active level (e.g., a high level).

When the first enable signal EN is changed from the inactive level to the active level during a period in which the carry signal GC_CR(n) has the active level, the gate signal masking circuit MC may output the gate pulse.

FIG. 18 illustrates a case where the first enable signal EN is changed from the active level (e.g., a low level) to the inactive level (e.g., a high level) during a period in which the carry signal GC_CR(n) has the active level (e.g., a high level).

When the first enable signal EN is changed from the active level to the inactive level during a period in which the carry signal GC_CR(n) has the active level, the gate signal masking circuit MC may not output the gate pulse.

Referring to FIGS. 15 to 18, in an embodiment, when the first enable signal EN has the inactive level (e.g., the high level) at the rising edge of the carry signal GC_CR(n), the gate signal masking circuit MC may output the gate pulse. In such an embodiment, when the first enable signal EN has the active level (e.g., the low level) at the rising edge of the carry signal GC_CR(n), the gate signal masking circuit MC may not output the gate pulse.

According to an embodiment of the invention, the output of the gate signal GC(n) may be controlled based on the carry signal GC_CR(n), the first enable signal EN and the second enable signal ENB so that the multiple division of the driving frequency may be supported.

Through the multiple division of the driving frequency, the power consumption of the display apparatus may be effectively reduced.

Figure 19:
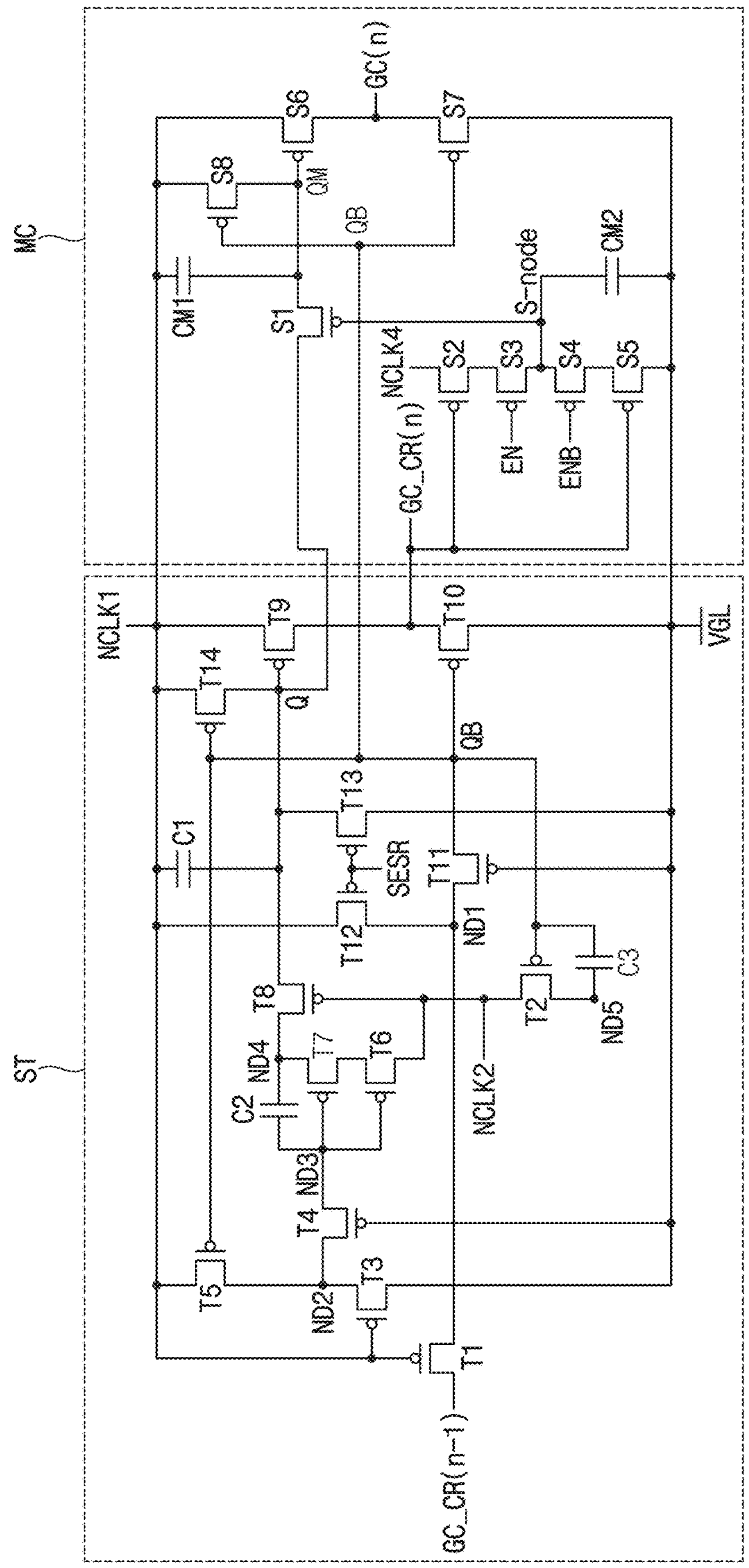
FIG. 19 is a circuit diagram illustrating a carry generator and a gate signal masking circuit of a gate driver according to an embodiment of the invention.

FIG. 19 is a circuit diagram illustrating a carry generator and a gate signal masking circuit of a gate driver according to an embodiment of the invention.

The gate signal masking circuit, the gate driver and the display apparatus according to an embodiment shown in FIG. 19 is substantially the same as the gate signal masking circuit, the gate driver and the display apparatus according to the embodiments described above with reference to FIGS. 1 to 18 except for the masking power signal of the gate signal masking circuit. Thus, the same reference numerals will be used to refer to the same or like parts as those described above with reference to FIGS. 1 to 18 and any repetitive detailed description thereof will be omitted or simplified.

Referring to FIGS. 1 to 6, 8 to 13 and 19, an embodiment of the display apparatus includes a display panel 100 and a display panel driver. In such an embodiment, the display panel driver includes a driving controller 200, a gate driver 300, a gamma reference voltage generator 400, a data driver 500 and an emission driver 600.

The gate driver 300 may include the carry generator ST that generates a carry signal GC_CR(n) based on a previous carry signal GC_CR(n−1), a first clock signal NCLK1, a second clock signal NCLK2 and a low power voltage VGL and a gate signal masking circuit MC connected to the carry generator ST.

The gate signal masking circuit MC may include a first switching element S1 including a control electrode connected to a masking control node S-node, a first electrode connected to a first control node Q and a second electrode connected to a third control node QM, a second switching element S2 including a control electrode that receives the carry signal GC_CR(n), a first electrode that receives a masking power signal and a second electrode connected to a first intermediate node, a third switching element S3 including a control electrode that receives the first enable signal EN, a first electrode connected to the first intermediate node and a second electrode connected to the masking control node S-node, a fourth switching element S4 including a control electrode that receives the second enable signal ENB, a first electrode connected to the masking control node S-node and a second electrode connected to a second intermediate node and a fifth switching element S5 including a control electrode that receives the carry signal GC_CR(n), a first electrode connected to the second intermediate node and a second electrode that receives a low power voltage VGL.

The gate signal masking circuit MC may further include a sixth switching element S6 including a control electrode connected to the third control node QM, a first electrode that receives the first clock signal NCLK1 and a second electrode connected to a gate output node, a seventh switching element S7 including a control electrode connected to a second control node QB, a first electrode connected to the gate output node and a second electrode that receives the low power voltage VGL and an eighth switching element S8 including a control electrode connected to the second control node QB, a first electrode that receives the first clock signal NCLK1 and a second electrode connected to the third control node QM.

The gate signal masking circuit MC may further include a first masking capacitor CM1 including a first electrode that receives the first clock signal NCLK1 and a second electrode connected to the third control node QM and a second masking capacitor CM2 including a first electrode connected to the masking control node S-node and a second electrode that receives the low power voltage VGL.

In an embodiment, the masking power signal may be a clock signal NCLK4. The clock signal NCLK4 may have a high level when the first enable signal EN changes from an active level (e.g., a low level) to an inactive level (e.g., a high level) and when the first enable signal EN changes from the inactive level (e.g., a high level) to the active level (e.g., a low level).

A signal having a high level in a transition of the first enable signal EN and the second enable signal ENB may be used as the masking power signal.

When one of the clock signals NCLK4 is used as the masking power signal as shown in FIG. 19, the carry generator ST and the gate signal masking circuit MC may operate without an additional high power voltage (VGH of FIG. 7).

Figure 20:
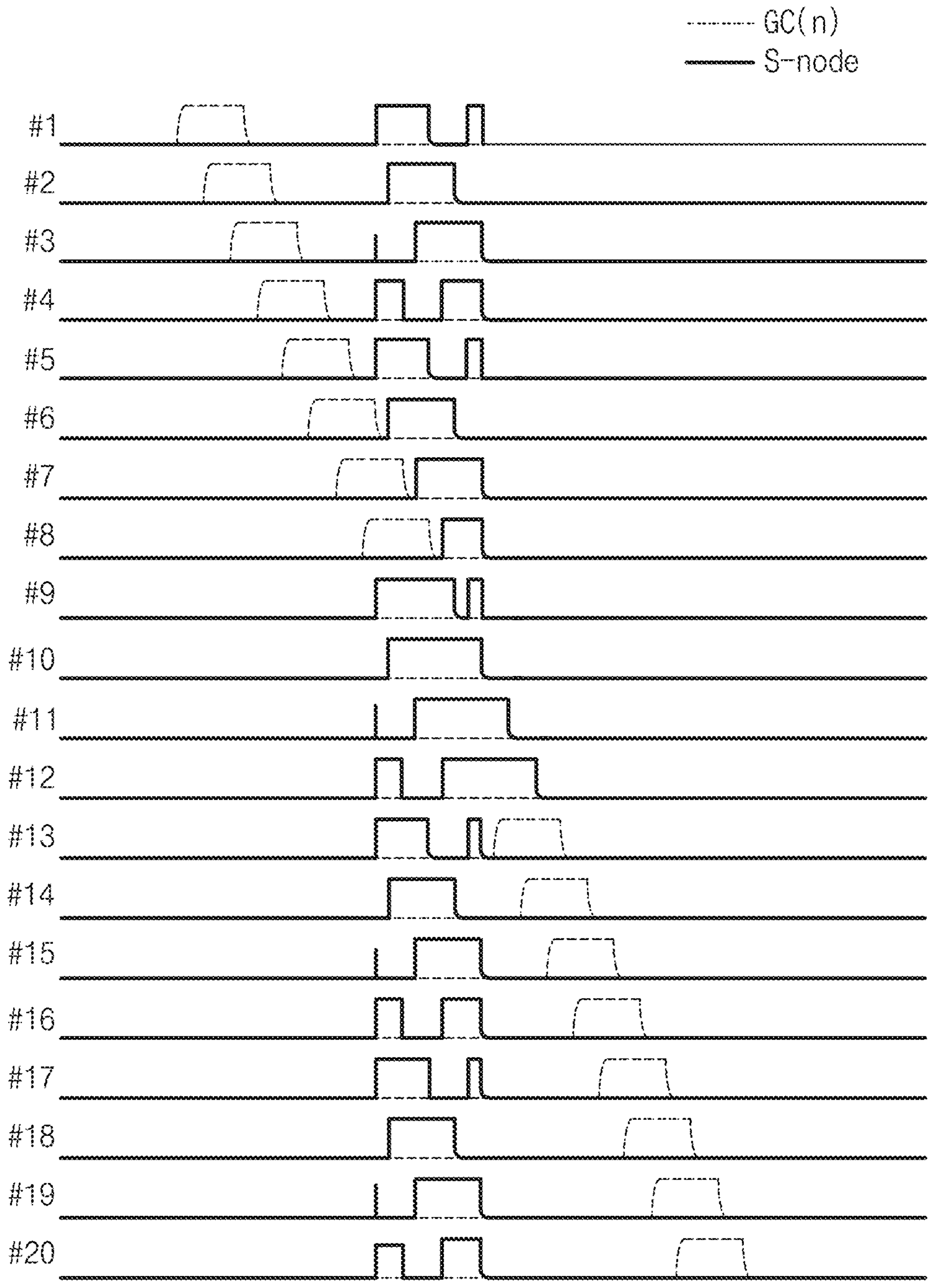
FIG. 20 is a timing diagram illustrating a signal of a masking control node and a gate output signal of the gate signal masking circuit of FIG. 19.
Figure 21:
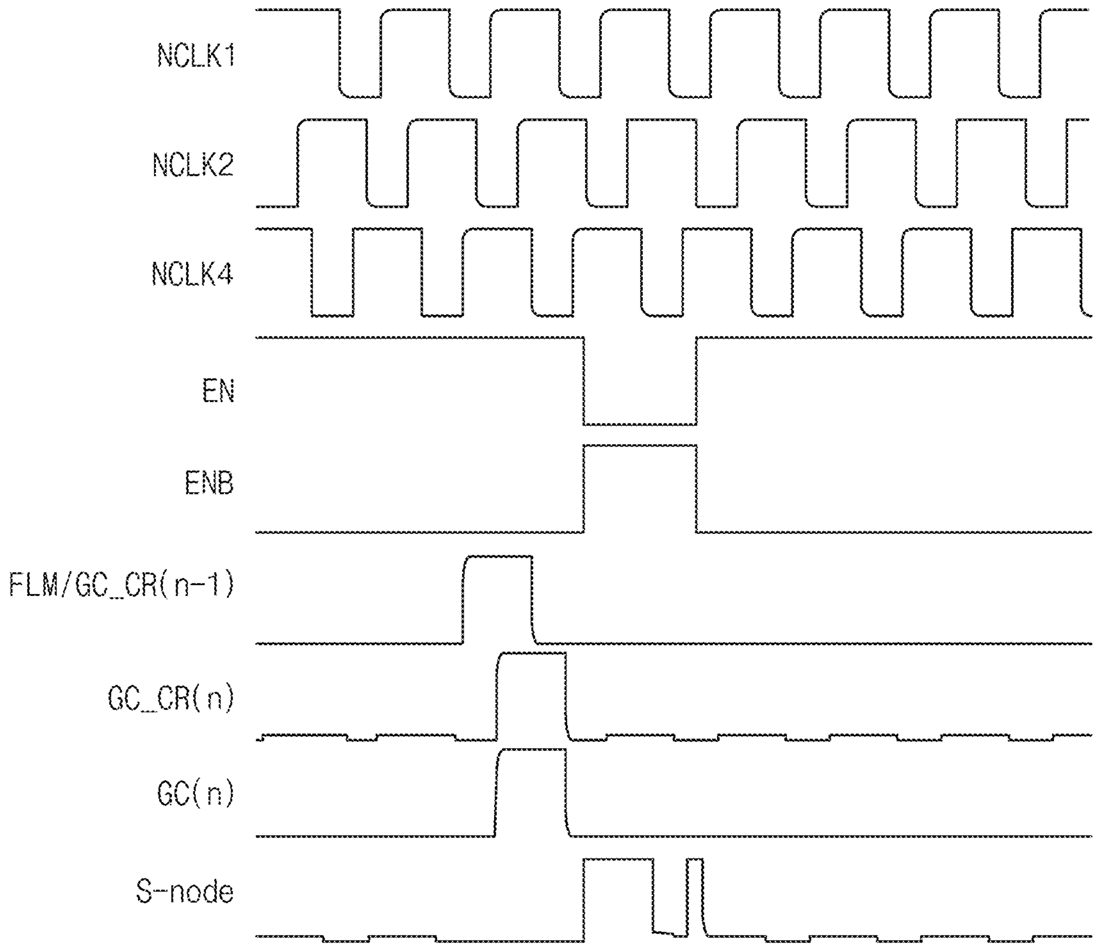
FIG. 21 is a timing diagram illustrating input signals, a node signal and output signals of the carry generator and the gate signal masking circuit of FIG. 19 in a first case.
Figure 22:
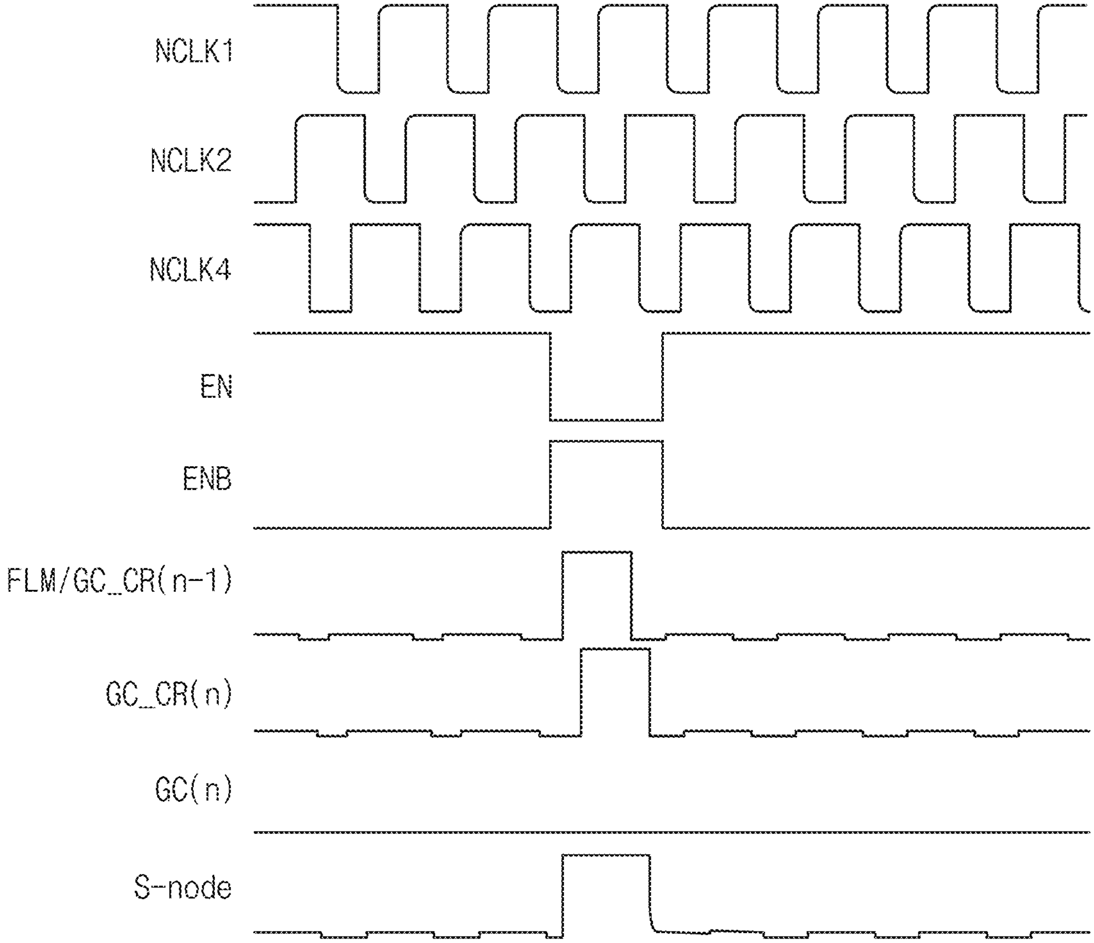
FIG. 22 is a timing diagram illustrating input signals, a node signal and output signals of the carry generator and the gate signal masking circuit of FIG. 19 in a second case.
Figure 23:
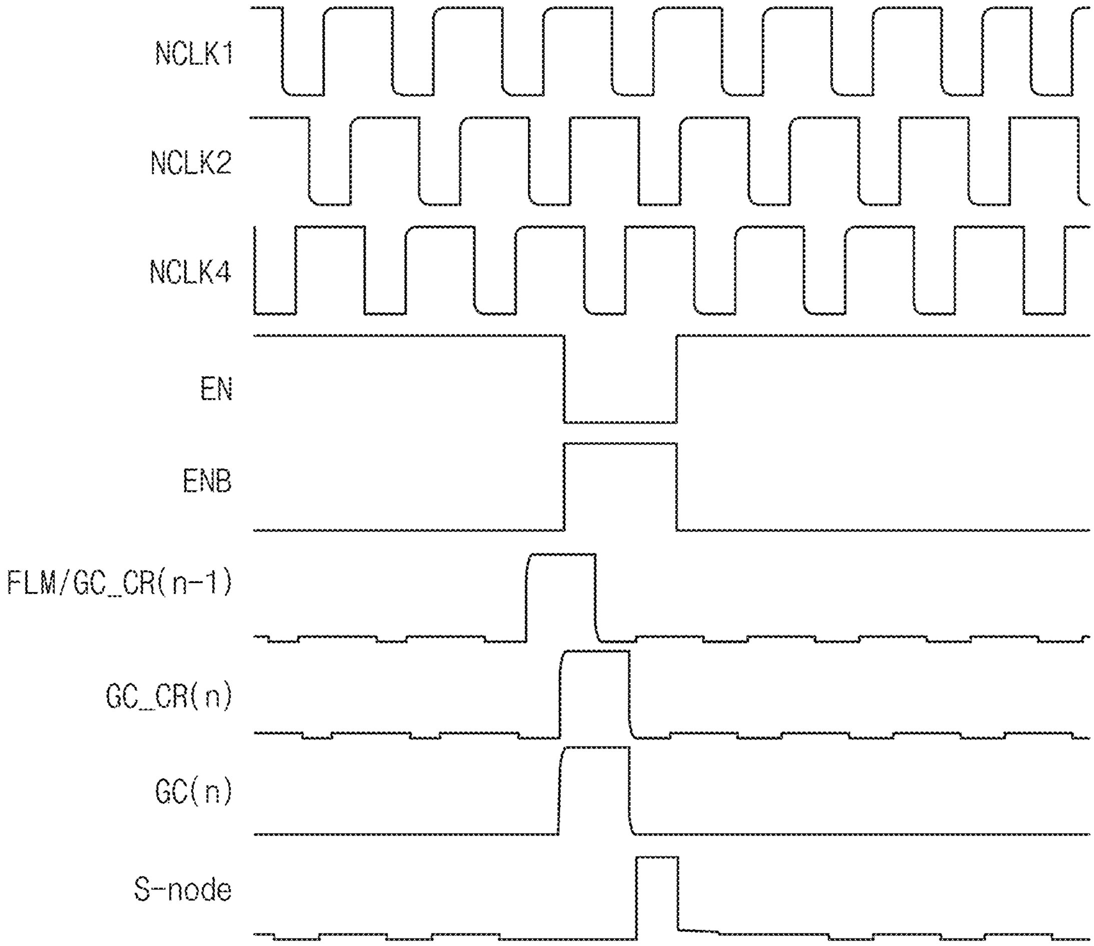
FIG. 23 is a timing diagram illustrating input signals, a node signal and output signals of the carry generator and the gate signal masking circuit of FIG. 19 in a third case.
Figure 24:
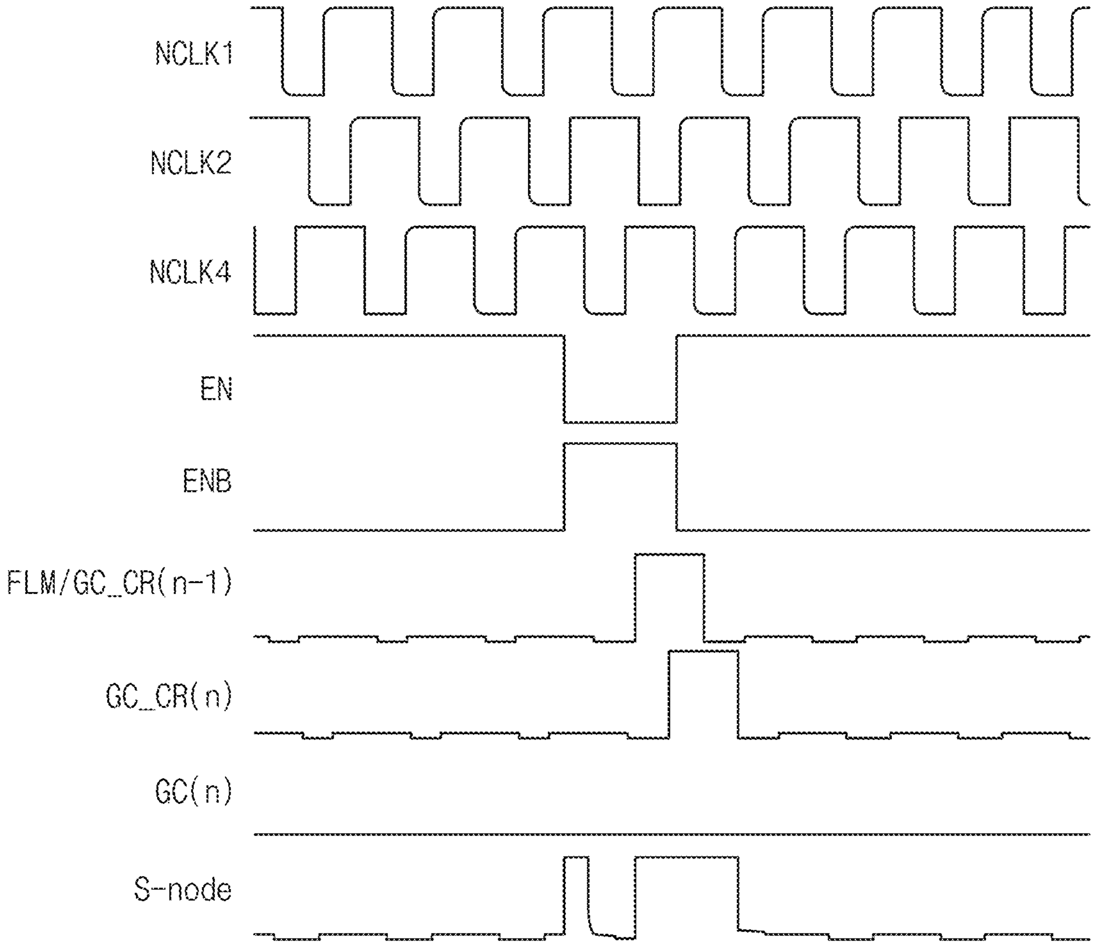
FIG. 24 is a timing diagram illustrating input signals, a node signal and output signals of the carry generator and the gate signal masking circuit of FIG. 19 in a fourth case.

FIG. 20 is a timing diagram illustrating a signal of a masking control node and a gate output signal of the gate signal masking circuit of FIG. 19. FIG. 21 is a timing diagram illustrating input signals, a node signal and output signals of the carry generator and the gate signal masking circuit of FIG. 19 in a first case. FIG. 22 is a timing diagram illustrating input signals, a node signal and output signals of the carry generator and the gate signal masking circuit of FIG. 19 in a second case. FIG. 23 is a timing diagram illustrating input signals, a node signal and output signals of the carry generator and the gate signal masking circuit of FIG. 19 in a third case. FIG. 24 is a timing diagram illustrating input signals, a node signal and output signals of the carry generator and the gate signal masking circuit of FIG. 19 in a fourth case.

Hereinafter, the operation of the gate signal masking circuit MC will be described in detail referring to FIGS. 20 to 24.

The gate signal masking circuit MC may include eight transistors S1 to S8 and two capacitors CM1 and CM2.

The gate driver 300 may use an output of the carry generator ST as the carry signal GC_CR(n) and an output of the gate signal masking circuit MC as the gate signal GC(n) for the multiple division of the driving frequency.

FIG. 20 illustrates a case in which the gate signal GC(n) is not outputted from ninth to twelfth gate lines (#9 to #12) among twenty gate lines (#1 to #20) due to a gate signal masking operation.

In this case, first to eighth gate lines (#1 to #8) and thirteenth to twentieth gate lines (#13 to #20) may output gate pulses, and the ninth to twelfth gate lines (#9 to #12) may not output gate pulses.

As shown in FIG. 20, on the line where the gate pulse is not outputted, the masking control node S-node may maintain a high level. When the masking control node S-node maintains the high level, the first switching element S1 may be turned off and the sixth switching element S6 may be turned off so that the gate output node may not output the gate pulse. In such an embodiment, the masking power signal is the fourth clock signal NCLK4 so that the voltage of the masking control node S-node does not maintain a high level constantly may have a period having a low level according to the pulse of the fourth clock signal NCLK4.

FIG. 21 illustrates a case where the first enable signal EN has an inactive level (e.g., a high level) in all periods in which the carry signal GC_CR(n) has an active level (e.g., a high level).

When the first enable signal EN has the inactive level in all periods in which the carry signal GC_CR(n) has the active level, the gate signal masking circuit MC may output the gate pulse.

FIG. 22 illustrates a case where the first enable signal EN has an active level (e.g., a low level) in all periods in which the carry signal GC_CR(n) has the active level (e.g., a high level).

When the first enable signal EN has the active level in all periods in which the carry signal GC_CR(n) has the active level, the gate signal masking circuit MC may not output the gate pulse.

FIG. 23 illustrates a case where the first enable signal EN is changed from the inactive level (e.g., a high level) to the active level (e.g., a low level) during a period in which the carry signal GC_CR(n) has the active level (e.g., a high level), When the first enable signal EN is changed from the inactive level to the active level during a period in which the carry signal GC_CR(n) has the active level, the gate signal masking circuit MC may output the gate pulse.

FIG. 24 illustrates a case where the first enable signal EN is changed from the active level (e.g., a low level) to the inactive level (e.g., a high level) during a period in which the carry signal GC_CR(n) has the active level (e.g., a high level), When the first enable signal EN is changed from the active level to the inactive level during a period in which the carry signal GC_CR(n) has the active level, the gate signal masking circuit MC may not output the gate pulse.

Referring to FIGS. 15 to 18, in an embodiment, when the first enable signal EN has the inactive level (e.g., the high level) at the rising edge of the carry signal GC_CR(n), the gate signal masking circuit MC may output the gate pulse. In such an embodiment, when the first enable signal EN has the active level (e.g., the low level) at the rising edge of the carry signal GC_CR(n), the gate signal masking circuit MC may not output the gate pulse.

According to an embodiment, the output of the gate signal GC(n) may be controlled based on the carry signal GC_CR (n), the first enable signal EN and the second enable signal ENB so that the multiple division of the driving frequency may be supported.

Through the multiple division of the driving frequency, the power consumption of the display apparatus may be effectively reduced.

Figure 25:
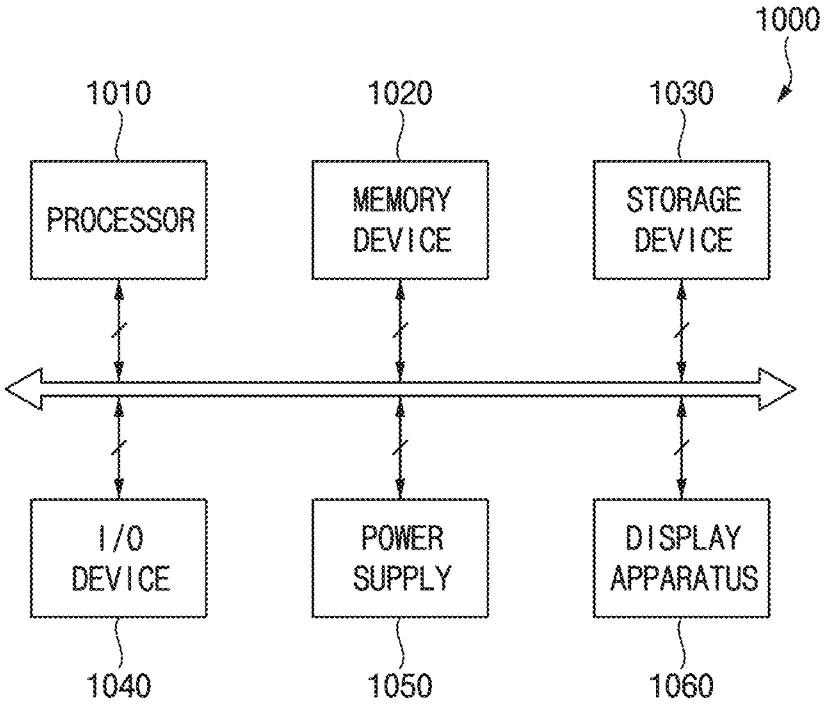
FIG. 25 is a block diagram illustrating an electronic apparatus according to an embodiment of the invention.
Figure 26:
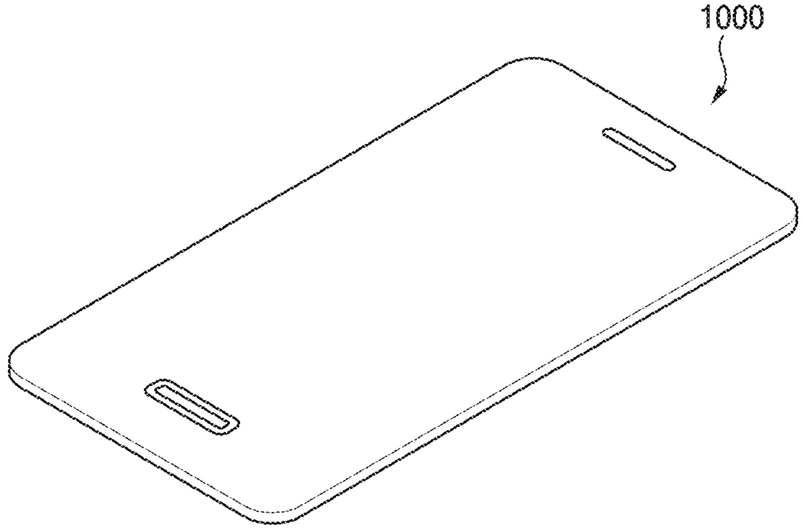
FIG. 26 is a diagram illustrating an example in which the electronic apparatus of FIG. 25 is implemented as a smart phone.

FIG. 25 is a block diagram illustrating an electronic apparatus according to an embodiment of the invention. FIG. 26 is a diagram illustrating an example in which the electronic apparatus of FIG. 25 is implemented as a smart phone.

Referring to FIGS. 25 and 26, an embodiment of the electronic apparatus 1000 may include a processor 1010, a memory device 1020, a storage device 1030, an input/output (I/O) device 1040, a power supply 1050, and a display apparatus 1060. In such an embodiment, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 26, the electronic apparatus 1000 may be implemented as a smart phone. However, the electronic apparatus 1000 is not limited thereto. In an alternative embodiment, for example, the electronic apparatus 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to embodiments of the gate signal masking circuit, the gate driver and the display apparatus, the power consumption of the display apparatus may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate signal masking circuit comprising:

a first switching element including a control electrode connected to a masking control node, a first electrode connected to a first control node and a second electrode connected to a third control node;

a second switching element including a control electrode which receives a carry signal, a first electrode which receives a masking power signal and a second electrode connected to a first intermediate node;

a third switching element including a control electrode which receives a first enable signal, a first electrode connected to the first intermediate node and a second electrode connected to the masking control node;

a fourth switching element including a control electrode which receives a second enable signal, a first electrode connected to the masking control node and a second electrode connected to a second intermediate node; and a fifth switching element including a control electrode which receives the carry signal, a first electrode connected to the second intermediate node and a second electrode which receives a low power voltage.

2. The gate signal masking circuit of claim 1, further comprising:

a sixth switching element including a control electrode connected to the third control node, a first electrode which receives a first clock signal and a second electrode connected to a gate output node;

a seventh switching element including a control electrode connected to a second control node, a first electrode connected to the gate output node and a second electrode which receives the low power voltage; and an eighth switching element including a control electrode connected to the second control node, a first electrode which receives the first clock signal and a second electrode connected to the third control node.

3. The gate signal masking circuit of claim 2, further comprising:

a first masking capacitor including a first electrode which receives the first clock signal and a second electrode connected to the third control node; and a second masking capacitor including a first electrode connected to the masking control node and a second electrode which receives the low power voltage.

4. The gate signal masking circuit of claim 1, wherein the masking power signal is a clock signal having a high level when the first enable signal changes from an active level to an inactive level and when the first enable signal changes from the inactive level to the active level.

5. The gate signal masking circuit of claim 1, wherein when the first enable signal has an inactive level in all periods in which the carry signal has an active level, the gate signal masking circuit outputs a gate pulse.

6. The gate signal masking circuit of claim 1, wherein when the first enable signal has an active level in all periods in which the carry signal has an active level, the gate signal masking circuit does not output a gate pulse.

7. The gate signal masking circuit of claim 1, wherein when the first enable signal is changed from an inactive level to an active level during a period in which the carry signal has an active level, the gate signal masking circuit outputs a gate pulse.

8. The gate signal masking circuit of claim 1, wherein when the first enable signal is changed from an active level to an inactive level during a period in which the carry signal has an active level, the gate signal masking circuit does not output a gate pulse.

9. A gate driver comprising:

a carry generator which generates a carry signal based on a previous carry signal, a first clock signal, a second clock signal and a low power voltage; and a gate signal masking circuit connected to the carry generator, wherein the gate signal masking circuit comprises:

a first switching element including a control electrode connected to a masking control node, a first electrode connected to a first control node and a second electrode connected to a third control node;

a second switching element including a control electrode which receives the carry signal, a first electrode which receives a masking power signal and a second electrode connected to a first intermediate node;

a third switching element including a control electrode which receives a first enable signal, a first electrode connected to the first intermediate node and a second electrode connected to the masking control node;

a fourth switching element including a control electrode which receives a second enable signal, a first electrode connected to the masking control node and a second electrode connected to a second intermediate node; and a fifth switching element including a control electrode which receives the carry signal, a first electrode connected to the second intermediate node and a second electrode which receives the low power voltage.

10. The gate driver of claim 9, wherein the gate signal masking circuit further comprises:

a sixth switching element including a control electrode connected to the third control node, a first electrode which receives the first clock signal and a second electrode connected to a gate output node;

a seventh switching element including a control electrode connected to a second control node, a first electrode connected to the gate output node and a second electrode which receives the low power voltage; and an eighth switching element including a control electrode connected to the second control node, a first electrode which receives the first clock signal and a second electrode connected to the third control node.

11. The gate driver of claim 10, wherein the gate signal masking circuit further comprises:

a first masking capacitor including a first electrode which receives the first clock signal and a second electrode connected to the third control node; and a second masking capacitor including a first electrode connected to the masking control node and a second electrode which receives the low power voltage.

12. The gate driver of claim 9, wherein the carry generator comprises:

a first gate switching element including a control electrode which receives the first clock signal, a first electrode which receives the previous carry signal and a second electrode connected to a first node;

a second gate switching element including a control electrode connected to a second control node, a first electrode which receives the second clock signal and a second electrode connected to a fifth node;

a third gate switching element including a control electrode which receives the first clock signal, a first electrode connected to a second node and a second electrode which receives the low power voltage;

a fourth gate switching element including a control electrode which receives the low power voltage, a first electrode connected to the second node and a second electrode connected to a third node;

a fifth gate switching element including a control electrode connected to the second control node, a first electrode which receives the first clock signal and a second electrode connected to the second node;

a sixth gate switching element including a control electrode connected to the third node, a first electrode which receives the second clock signal and a second electrode connected to a third intermediate node;

a seventh gate switching element including a control electrode connected to the third node, a first electrode connected to a fourth node and a second electrode connected to the third intermediate node;

an eighth gate switching element including a control electrode which receives the second clock signal, a first electrode connected to the fourth node and a second electrode connected to the first control node;

a ninth gate switching element including a control electrode connected to the first control node, a first electrode which receives the first clock signal and a second electrode connected to a carry output node;

a tenth gate switching element including a control electrode connected to the second control node, a first electrode connected to the carry output node and a second electrode which receives the low power voltage;

an eleventh switching element including a control electrode which receives the low power voltage, a first electrode connected to the first node and a second electrode connected to the second control node; and a fourteenth switching element including a control electrode connected to the second control node, a first electrode which receives the first clock signal and a second electrode connected to the first control node.

13. The gate driver of claim 12, wherein the carry generator further comprises:

a twelfth gate switching element including a control electrode which receives a reset signal, a first electrode which receives the first clock signal and a second electrode connected to the first node; and a thirteenth gate switching element including a control electrode which receives the reset signal, a first electrode connected to the first control node and a second electrode connected to the low power voltage.

14. The gate driver of claim 12, wherein the carry generator further comprises:

a first capacitor including a first electrode which receives the first clock signal and a second electrode connected to the first control node;

a second capacitor including a first electrode connected to the third node and a second electrode connected to the fourth node; and a third capacitor including a first electrode connected to the fifth node and a second electrode connected to the second control node.

15. The gate driver of claim 12, wherein the control electrode of the tenth gate switching element and the control electrode of the fourteenth gate switching element are connected to the control electrode of a seventh switching element of the gate signal masking circuit and the control electrode of an eighth switching element of the gate signal masking circuit.

16. The gate driver of claim 12, wherein the control electrode of the ninth gate switching element is connected to the first electrode of the first switching element of the gate signal masking circuit.

17. A display apparatus comprising:

a display panel including a pixel including a switching element of a first type and a switching element of a second type different from the first type;

a gate driver which outputs a gate signal to the display panel; and a data driver which outputs a data voltage to the display panel, wherein the gate driver comprises:

a carry generator which generates a carry signal based on a previous carry signal, a first clock signal, a second clock signal and a low power voltage; and a gate signal masking circuit connected to the carry generator, wherein the gate signal masking circuit comprises:

a first switching element including a control electrode connected to a masking control node, a first electrode connected to a first control node and a second electrode connected to a third control node;

a second switching element including a control electrode which receives the carry signal, a first electrode which receives a masking power signal and a second electrode connected to a first intermediate node;

a third switching element including a control electrode which receives a first enable signal, a first electrode connected to the first intermediate node and a second electrode connected to the masking control node;

a fourth switching element including a control electrode which receives a second enable signal, a first electrode connected to the masking control node and a second electrode connected to a second intermediate node; and a fifth switching element including a control electrode which receives the carry signal, a first electrode connected to the second intermediate node and a second electrode which receives the low power voltage.

18. The display apparatus of claim 17, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives an emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element; and the light emitting element including the anode electrode and a cathode electrode which receives a pixel low power voltage, and wherein an output signal of the gate signal masking circuit is the compensation gate signal.

19. The display apparatus of claim 17, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives an emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element; and the light emitting element including the anode electrode and a cathode electrode which receives a pixel low power voltage, wherein the light emitting element initialization gate signal is a data writing gate signal of a previous stage, and wherein an output signal of the gate signal masking circuit is the compensation gate signal.

20. The display apparatus of claim 17, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives an emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element;

an eighth pixel switching element including a control electrode which receives a bias gate signal, a first electrode which receives a bias voltage and a second electrode connected to the second pixel node; and the light emitting element including the anode electrode and a cathode electrode which receives a pixel low power voltage, and wherein an output signal of the gate signal masking circuit is the compensation gate signal.

21. A gate driver comprising:

a carry generator which generates a carry signal based on a previous carry signal, a first clock signal, a second clock signal and a low power voltage; and a gate signal masking circuit connected to the carry generator, wherein the gate signal masking circuit outputs a gate pulse or stops outputting the gate pulse based on the carry signal, a first enable signal and a second enable signal, wherein the second enable signal is an inverted signal of the first enable signal, wherein when the first enable signal has an inactive level at a rising edge of the carry signal, the gate signal masking circuit outputs the gate pulse, and wherein when the first enable signal has an active level at the rising edge of the carry signal, the gate signal masking circuit does not output the gate pulse.

22. The gate driver of claim 21, wherein the gate signal masking circuit comprises:

a first switching element including a control electrode connected to a masking control node, a first electrode connected to a first control node and a second electrode connected to a third control node;

a second switching element including a control electrode which receives the carry signal, a first electrode which receives a masking power signal and a second electrode connected to a first intermediate node;

a third switching element including a control electrode which receives the first enable signal, a first electrode connected to the first intermediate node and a second electrode connected to the masking control node;

a fourth switching element including a control electrode which receives the second enable signal, a first electrode connected to the masking control node and a second electrode connected to a second intermediate node; and a fifth switching element including a control electrode which receives the carry signal, a first electrode connected to the second intermediate node and a second electrode which receives the low power voltage.

23. A display apparatus comprising:

a display panel including a pixel including a switching element of a first type and a switching element of a second type different from the first type;

a gate driver which outputs a gate signal to the display panel; and a data driver which outputs a data voltage to the display panel, wherein the gate driver comprises:

a carry generator which generates a carry signal based on a previous carry signal, a first clock signal, a second clock signal and a low power voltage; and a gate signal masking circuit connected to the carry generator, wherein the gate signal masking circuit outputs a gate pulse or stops outputting the gate pulse based on the carry signal, a first enable signal and a second enable signal, wherein the second enable signal is an inverted signal of the first enable signal, wherein when the first enable signal has an inactive level at a rising edge of the carry signal, the gate signal masking circuit outputs the gate pulse, and wherein when the first enable signal has an active level at the rising edge of the carry signal, the gate signal masking circuit does not output the gate pulse.

* * * * *